United States Patent
Garg et al.

(10) Patent No.: US 8,038,981 B2
(45) Date of Patent: Oct. 18, 2011

(54) HYDROGEN PRODUCTION USING COMPLEX METAL OXIDE PELLETS

(75) Inventors: Diwakar Garg, Emmaus, PA (US); Robert Quinn, Macungie, PA (US); Frederick Carl Wilhelm, Zionsville, PA (US); Gokhan Alptekin, Boulder, CO (US); Margarita Dubovik, Loveland, CO (US); Matthew Schaefer, Arvada, CO (US)

(73) Assignee: Air Products and Chemicals, Inc., Allentown, PA (US)

( * ) Notice: Subject to any disclaimer, the term of this patent is extended or adjusted under 35 U.S.C. 154(b) by 218 days.

(21) Appl. No.: 12/352,863

(22) Filed: Jan. 13, 2009

(65) Prior Publication Data

US 2009/0196822 A1 Aug. 6, 2009

Related U.S. Application Data

(63) Continuation-in-part of application No. 12/044,460, filed on Mar. 7, 2008, now abandoned.

(60) Provisional application No. 61/026,298, filed on Feb. 5, 2008.

(51) Int. Cl.
*C01B 3/24* (2006.01)
*C01B 3/26* (2006.01)

(52) U.S. Cl. .................................. 423/650; 423/654

(58) Field of Classification Search ............... 423/650
See application file for complete search history.

(56) References Cited

U.S. PATENT DOCUMENTS

| | | | |
|---|---|---|---|
| 4,578,089 A | 3/1986 | Richter et al. | |
| 5,055,441 A | 10/1991 | McCarron, III et al. | |
| 5,220,110 A * | 6/1993 | King et al. | 588/318 |
| 5,507,980 A * | 4/1996 | Kelkar et al. | 264/15 |
| 5,827,496 A | 10/1998 | Lyon | |
| 6,007,699 A | 12/1999 | Cole | |
| 6,238,816 B1 | 5/2001 | Cable et al. | |
| 6,261,465 B1 * | 7/2001 | Hancock | 210/763 |
| 6,322,766 B1 | 11/2001 | Schicketanz et al. | |
| 6,506,510 B1 | 1/2003 | Sioui et al. | |
| 6,682,838 B2 | 1/2004 | Stevens | |
| 6,761,838 B2 | 7/2004 | Zeng et al. | |
| 6,767,530 B2 | 7/2004 | Kobayashi et al. | |
| 6,974,566 B2 | 12/2005 | Sabacky et al. | |

(Continued)

FOREIGN PATENT DOCUMENTS

EP 0 411 506 A2 2/1991

(Continued)

OTHER PUBLICATIONS

Quinn, U.S. Appl. No. 11/737,942, Apr. 20, 2007.

(Continued)

*Primary Examiner* — Melvin Mayes
*Assistant Examiner* — Kenneth Vaden
(74) *Attorney, Agent, or Firm* — Bryan C. Hoke, Jr.

(57) ABSTRACT

Complex metal oxide-containing pellets and their use for producing hydrogen. The complex metal oxide-containing pellets are suitable for use in a fixed bed reactor due to sufficient crush strength. The complex metal oxide-containing pellets comprise one or more complex metal oxides and at least one of in-situ formed calcium titanate and calcium aluminate. calcium titanate and calcium aluminate are formed by reaction of suitable precursors in a mixture with one or more complex metal carbonates. The complex metal oxide-containing pellets optionally comprise at least one precious metal.

21 Claims, 1 Drawing Sheet

U.S. PATENT DOCUMENTS

| | | | |
|---|---|---|---|
| 7,070,752 | B2 | 7/2006 | Zeng et al. |
| 7,214,331 | B2 * | 5/2007 | Jiang et al. .................. 252/373 |
| 7,429,373 | B2 * | 9/2008 | Pez et al. ...................... 423/652 |
| 2002/0010220 | A1 | 1/2002 | Zeng |
| 2002/0071806 | A1 | 6/2002 | Sabacky et al. |
| 2003/0035770 | A1 | 2/2003 | Cole |
| 2003/0150163 | A1 | 8/2003 | Murata et al. |
| 2003/0229151 | A1 | 12/2003 | Hurlburt et al. |
| 2004/0191166 | A1 | 9/2004 | Hershkowitz et al. |
| 2005/0112056 | A1 | 5/2005 | Hampden-Smith |
| 2005/0229488 | A1 | 10/2005 | Stevens |
| 2005/0229490 | A1 | 10/2005 | Stevens et al. |
| 2005/0232856 | A1 | 10/2005 | Stevens |
| 2006/0292066 | A1 | 12/2006 | Pez |
| 2006/0292069 | A1 | 12/2006 | Pez |
| 2007/0172418 | A1 | 7/2007 | Slager |
| 2007/0172419 | A1 | 7/2007 | Peng et al. |
| 2008/0260621 | A1 * | 10/2008 | Quinn et al. ............... 423/594.2 |

FOREIGN PATENT DOCUMENTS

| | | |
|---|---|---|
| EP | 0 737 648 B1 | 10/1996 |
| EP | 1 134 187 A2 | 9/2001 |
| EP | 1 736 437 A2 | 12/2006 |
| EP | 1 736 438 A2 | 12/2006 |
| EP | 1 816 102 A2 | 8/2007 |
| EP | 2 039 426 A1 | 3/2009 |
| JP | 60-110336 A | 6/1985 |
| JP | 61-86944 A | 5/1986 |
| WO | 99/02471 A1 | 1/1999 |
| WO | 2008/004385 A1 | 1/2008 |

OTHER PUBLICATIONS

Ding, Y., "Adsorption-Enhanced Steam Methane Reforming", Chem. Eng. Sci. 55, (2000) pp. 3929-3940.

Balasubramanian, B., "Hydrogen from Methane in a single-Step Process," Chem. Eng. Sci. 54, (1999), pp. 3543-3552.

Brun-Tsekhovoi, A. R., et al., "The Process of Catalytic Stream-Reforming of Hydrocarbons in the Presence of Carbon Dioxide Acceptor," Hydrogen Energy Progress VII, Proceedings of the 7th Wrold Hydrogen Energy Conference, Moscow (vol. 2, 1988), pp. 885-900.

Nakahara, et al., "Synthesis and crystal structure of (sr1-xCax)2FeMnOy (x=0-1.0)," Elsevier Science B.V. Materials Letters, 30, (Feb. 1997), pp. 163-167.

Vidyasagar, K., et al., "A Convenient Route for the Synthesis of Complex Metal Oxides Employing Solid-Solution Precursors," Inorg. Chem., 1984 (23), 1206-1210.

Zang, Z. C., et al., "Hydrogen Production from Methane and Water by Lattice Oxygen Transfer with $Ce_{0.70}Zr_{0.25}Tb_{0.05}O_{2-x}$," J. Alloys and Compounds, 323-324 (2001), pp. 97-101.

Hufton, J., et al., "Sorption Enhanced Reaction Process (SERP) for the Production of Hydrogen", Air Products and Chemicals, Inc., Allentown, PA 18195, Proceedings of the 2000 Hydrogen Program Review, NREL/CP-570-28890, pp. 1-12.

Aihara, Masahiko, et al., "Development of porous solid reactant for thermal-energy storage and temperature upgrade using carbonation/decarbonation reaction", Applied Energy, 69, (2001) 225-238.

Shin; "Separation of a Binary Gas Mixture by Pressure Swing Adsorption: Comparison of Different PSA Cycles"; Adsorption; vol. 1; 1995; pp. 321-333; XP-002464015.

Waldron, W.E., et al., "Parametric Study of a Pressure Swing Adsorption Process;" Adsorption, vol. 6; 2000; pp. 179-188; XP-002464014.

Kipkoech, E., et al; "Microstrucutal Control of Microwave Dielectric Properties in $CaTiO_3$-$La(Mg_{1/2}Ti_{1/2})O_3$ Ceramics"; Journal of Applied Physics, American Institute of Physics; New York, US; Vo. 97, No. 6; Mar. 7, 2005; pp. 64103-064103; XP-012070864.

* cited by examiner

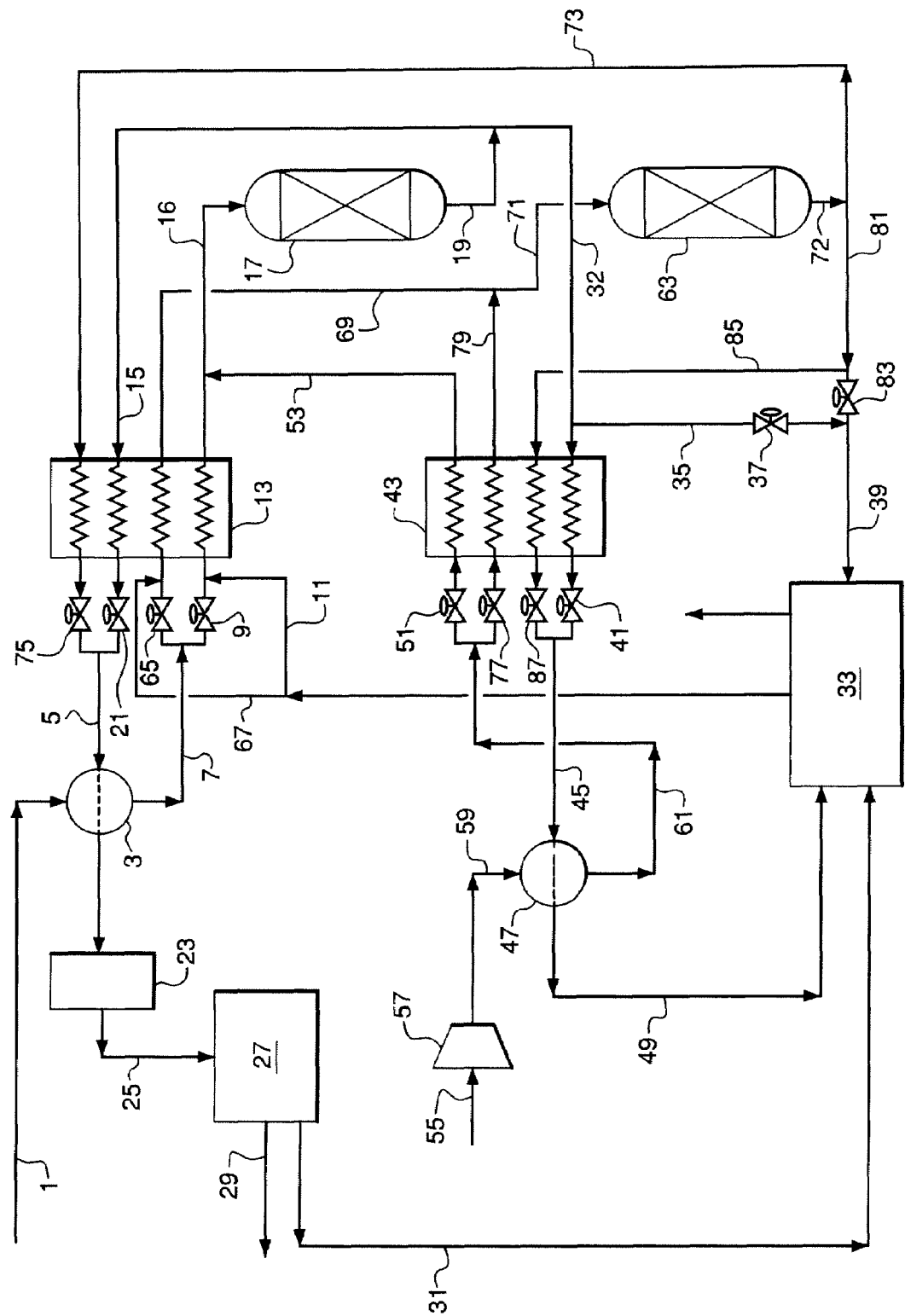

HYDROGEN PRODUCTION USING COMPLEX METAL OXIDE PELLETS

This patent application is a continuation-in-part of U.S. patent application Ser. No. 12/044,460, filed Mar. 7, 2008 which claims the benefit of U.S. Provisional Application Ser. No. 61/026,298, filed on Feb. 5, 2008, the specification and claims which are incorporated by reference and made a part of this application.

BACKGROUND

Numerous methods for producing hydrogen gas are known in the art. The production of industrial-scale volumes of hydrogen is typically accomplished by application of the steam-methane reforming process, which entails the catalytic reforming of natural gas with steam at elevated temperatures (800-950° C.). This process yields a crude synthesis gas, which is a mixture of hydrogen, carbon monoxide, and carbon dioxide, and the crude synthesis gas is further reacted in a catalytic water-gas shift conversion step to convert carbon monoxide with water to additional hydrogen and carbon dioxide. The shifted synthesis gas is purified to yield a final hydrogen product containing greater than 99 volume % hydrogen.

An alternative process for the production of hydrogen is the partial oxidation of methane to form synthesis gas, which is subsequently shifted if necessary and purified. Partial oxidation is known to be highly exothermic.

Another alternative process to generate synthesis gas for hydrogen production is autothermal reforming, which is essentially a thermally balanced combination of the steam-methane reforming process and partial oxidation. One considerable drawback associated with these alternative processes is that partial oxidation requires a supply of high purity oxygen gas to the reaction system. Therefore, the use of these processes requires the additional step of separating air to produce the oxygen gas, and the air separation process increases the capital and operating costs of hydrogen production.

More recently, a new process for producing hydrogen utilizing complex metal oxides has been disclosed in U.S. patent application Ser. No. 11/165,720 (Pub. No. U.S. 2006-0292066-A1), Ser. No. 11/165,731 (Pub. No. US 2006-0292069-A1), Ser. No. 11/339,060 (Pub. No. 2007-0172418-A1), Ser. No. 11/339,806 (Pub. No. US 2007-0172419-A1), and Ser. No. 11/737,942.

The hydrogen producing process using complex metal oxides may be operated in an autothermal and cyclic manner for the synthesis of hydrogen from a hydrocarbon, (e.g. methane), steam and air. It utilizes the complex metal oxide as a $CO_2$ sorbent and as a source of oxygen for methane oxidation during reforming of methane with steam. In the production step of the process, largely pure hydrogen is obtained by the reaction of steam and methane in the presence of the complex metal oxide and a steam hydrocarbon reforming catalyst. The methane oxidation during the production step reaction provides heat for the reforming reaction. During the production step, the complex metal oxide sorbs $CO_2$ and the complex metal oxide is reduced. In the regeneration step of the process, the spent complex metal oxide is regenerated with air or other oxygen-containing gas, thereby liberating $CO_2$, and reconstituting the complex metal oxide.

Complex metal oxide is generally synthesized in a powder form. Since the use of powder in a fixed bed reactor may result in an unacceptably high pressure drop through the reactor, it would be desirable to form this powder into pellets for use in a fixed bed reactor. Pellets are useful to allow a reasonable pressure drop through the fixed bed reactor. Pellets may also be useful for ebullated, expanded, or fluidized beds.

It has been found that conventional methods for forming pellets are not suitable for forming dimensionally stable pellets from complex metal oxides for long term use in hydrogen production. Complex metal oxide material undergoes more than a 40% volumetric expansion and contraction due to the sorption and desorption of $CO_2$. Because of the expansion and contraction, complex metal oxide-containing pellets prepared using conventional binders and conventional techniques such as extrusion or pelletization of powder fall apart within a few $CO_2$ sorption and desorption cycles. Furthermore, complex metal oxide-containing pellets using conventional binders and conventional techniques do not have sufficient crush strength to be useful in a fixed bed reactor.

It would be desirable to produce hydrogen in a fixed bed reactor using complex metal oxide-containing pellets having structural and dimensional stability.

It would be desirable to form complex metal oxide-containing pellets having structural and dimensional stability from complex metal oxide powder.

BRIEF SUMMARY

The present invention relates to complex metal oxide-containing pellets and their use for producing hydrogen-containing gas. Complex metal oxide-containing pellets, and a reactor, method and process for producing a hydrogen-containing gas are disclosed.

The reactor for producing a hydrogen-containing gas comprises a bed which contains complex metal oxide-containing pellets and optionally contains steam-hydrocarbon reforming catalyst pellets. At least a portion of the complex metal oxide-containing pellets comprise at least one precious metal selected from the group consisting of Pt, Rh and Pd when the bed does not contain steam-hydrocarbon reforming catalyst pellets. The complex metal oxide-containing pellets optionally comprise at least one precious metal selected from the group consisting of Pt, Rh and Pd when the bed does contain steam-hydrocarbon reforming catalyst.

The method of producing a hydrogen-containing gas comprises reacting at least one hydrocarbon with steam in a bed which contains complex metal oxide-containing pellets and which optionally contains steam-hydrocarbon reforming catalyst pellets in a production step under reaction conditions sufficient to form hydrogen gas and reduced complex metal oxide-containing pellets. At least a portion of the complex metal oxide-containing pellets comprise at least one precious metal selected from the group consisting of Pt, Rh and Pd when the bed does not contain steam-hydrocarbon reforming catalyst pellets. The complex metal oxide-containing pellets optionally comprise at least one precious metal selected from the group consisting of Pt, Rh and Pd when the bed does contain steam-hydrocarbon reforming catalyst.

The process of producing a hydrogen-containing gas comprises a step of providing a reactor, a production step and a regeneration step. The production step and the regeneration step are repeated in a cyclic manner.

The step of providing the reactor includes providing a reactor containing a bed which contains complex metal oxide-containing pellets and optionally contains steam-hydrocarbon reforming catalyst pellets. At least a portion of the complex metal oxide-containing pellets may comprise at least one precious metal selected from the group consisting of Pt, Rh and Pd when the bed does not contain steam-hydrocarbon reforming catalyst pellets. The complex metal oxide-containing pellets may optionally comprise the at least one precious metal when the bed does contain steam-hydrocarbon reforming catalyst.

The production step comprises introducing steam and a feed gas containing at least one hydrocarbon and optionally a small amount of hydrogen into the reactor, reacting the at least one hydrocarbon with the steam in the bed under reaction conditions sufficient to form hydrogen and reduced complex metal oxide-containing pellets, and withdrawing a product gas comprising hydrogen from the reactor.

The regeneration step comprises regenerating the reactor by reacting the reduced complex metal oxide-containing pellets with an oxygen source gas under reaction conditions sufficient to oxidize the complex metal oxide-containing pellets and liberate the sorbed carbon dioxide.

For the reactor, method and process, complex metal oxide-containing pellets are utilized. The complex metal oxide-containing pellets comprise 30 to 85 mole % of at least one of calcium titanate and calcium aluminate, and 15 to 70 mole % of one or more complex metal oxides. The one or more complex metal oxides are represented by the formula $A_xB_yO_n$. A represents at least one metallic element having an oxidation state ranging from +1 to +3, inclusive, wherein the at least one metallic element is capable of forming a metal carbonate. x is a number from 1 to 10, inclusive. B represents at least one metallic element having an oxidation state ranging from +1 to +7, inclusive. y is a number form 1 to 10, inclusive. n represents a value such that the complex metal oxide is rendered electrically neutral. The complex metal oxide containing pellets have a structure that gives a crush strength of 1 to 15 lbf/mm as determined in accordance with ASTM standard test method D 6175-03.

The complex metal oxide-containing pellets may have a structure, or arrangement of particles, wherein the crush strength is retained within 1 to 15 lbf/mm after 50 cycles of reduction and oxidation in a process of producing hydrogen. The complex metal oxide-containing pellets may have a structure wherein the crush strength is retained within 1 to 15 lbf/mm after 50 of the production steps and 50 of the regeneration steps.

The complex metal oxide-containing pellets may have a structure wherein the crush strength of the complex metal oxide-containing pellets are retained within 1 to 15 lbf/mm after 50 cycles of $CO_2$ sorption and $CO_2$ desorption wherein the $CO_2$ sorption is by exposing the complex metal oxide-containing pellets to a humidified reducing gas comprising 3 to 4 vol. % $H_2$, 93 to 94 vol. % $CO_2$ and 2 to 3 vol. % $H_2O$ at 750° C. and $CO_2$ desorption is by exposing the complex metal oxide-containing pellet s to humidified air comprising 2 to 3 vol. % $H_2O$ at 750° C.

The calcium titanate may be formed by reaction of at least one calcium precursor and $TiO_2$ in a mixture with one or more complex metal carbonates associated with the one or more complex metal oxides under reaction conditions sufficient to form calcium titanate.

The calcium aluminate may be formed by reaction of at least one calcium precursor and at least one of alumina and aluminum hydroxide in a mixture with one or more complex metal carbonates associated with the one or more complex metal oxides under reaction conditions sufficient to form calcium aluminate.

The complex metal oxide-containing pellets may comprise 15 to 70 mole % of a single complex metal oxide.

For some suitable complex metal oxides, A in the one or more complex metal oxides may represent at least one metallic element selected from the group consisting of elements of Groups 1, 2, and 3, and the Lanthanide elements of the IUPAC Periodic Table of the Elements. B may represent at least one metallic element selected from the group consisting of elements of Groups 4 to 15 of the IUPAC Periodic Table of the Elements.

For some suitable complex metal oxides, B in the one or more complex metal oxides may be selected from the group consisting of vanadium, chromium, manganese, iron, cobalt, copper, nickel, and mixtures thereof.

The one or more complex metal oxides may be selected from $Ca_2MnFeO_5$, $Ca_2MnFeO_4$, $Ca_2Co_2O_5$, $Ca_2Mn_2O_5$, $MgCaFeMnO_5$, $SrCo_{0.4}Fe_{0.4}Cu_{0.2}O_{3.8}$, $Sr_2Ni_2O_5$, $LaNiO_3$, $Ca_2Fe_2O_5$, and $Sr_2Mn_2O_5$.

The complex metal oxide-containing pellets may comprise 0.1 to 10 mass % or 0.2 to 5 mass % of the at least one precious metal selected from the group consisting of Pt, Rh, and Pd.

For some suitable complex metal oxides, A may be $A'_{x_1}Ca_{x_2}Mg_{x_3}$, and B may be $B'_{y_1}Mn_{y_2}Fe_{y_3}$. Here, A' represents at least one element selected from the group consisting of Sr, Ba, a Group 1 element, and an element of the Lanthanide series according to the IUPAC Periodic Table of the Elements; B' represents at least one element selected from the group consisting of Cu, Ni, Co, Cr, and V. Generally, $0 \leq x_1 \leq 1$, $0 \leq x_2 \leq 1$, $0 \leq x_3 \leq 1$, wherein $x_1+x_2+x_3=x$; $0 \leq y_1 \leq 1$, $0 \leq y_2 \leq 1$, $0 \leq y_3 \leq 1$, wherein $y_1+y_2+y_3=y$; $1 \leq x \leq 10$; and $1 \leq y \leq 10$. For some suitable complex metal oxides, $x_1=0$, $y_1=0$, $1 \leq x \leq 5$, and $1 \leq y \leq 5$.

The complex metal oxide-containing pellets may be made by a method of making a complex metal oxide-containing pellet comprising (a) preparing a mixture comprising water, at least one complex metal carbonate, at least one calcium precursor, at least one of $TiO_2$, $Al_2O_3$, $Al(OH)_3$ and AlO(OH), (b) forming a green pellet from the mixture; (c) heating the green pellet; (d) maintaining the green pellet within a temperature range for a first time period; (e) heating the green pellet further; (f) maintaining the green pellet within another temperature range for a second time period; and (g) cooling the green pellet to make the complex metal oxide-containing pellet. The green pellet is exposed to an atmosphere comprising oxygen during at least one of the steps (a) through (f). The green pellet may be exposed to an atmosphere comprising oxygen during all of the steps (a) through (f).

BRIEF DESCRIPTION OF SEVERAL VIEWS OF THE DRAWINGS

The FIGURE is a process flowsheet for the generation of hydrogen using the disclosed method, process, and reactor.

DETAILED DESCRIPTION

The articles "a" and "an" as used herein mean one or more when applied to any feature in embodiments of the present invention described in the specification and claims. The use of "a" and "an" does not limit the meaning to a single feature unless such a limit is specifically stated. The definite article "The" preceding singular or plural nouns or noun phrases denotes a particular specified feature or particular specified features and may have a singular or plural connotation depending upon the context in which it is used. The adjective "any" means one, some, or all indiscriminately of whatever quantity.

As used herein "at least a portion" means "a portion or all."

In one aspect, the present invention relates to a reactor, a method and a process for producing a hydrogen-containing gas by the reaction of one or more gaseous hydrocarbons with gaseous water, i.e. steam, under reaction conditions effective to form hydrogen.

The reactor for producing a hydrogen-containing gas comprises a bed containing complex metal oxide-containing pellets and optionally containing steam-hydrocarbon reforming catalyst pellets. The reactor may be a fixed-bed reactor. The fixed-bed reactor may be a tubular reactor. The reactor may be an ebullated, expanded, or fluidized bed reactor. The various reactor types are well-known in the art. In order to carry out the steam-hydrocarbon reforming reaction, at least a portion of the complex metal oxide-containing pellets may comprise a catalyst material suitable for steam-hydrocarbon reforming and/or separate steam-hydrocarbon reforming catalyst pellets may be contained in the bed. If desired, the bed may additionally contain other types of pellets, flow directing devices, or the like.

At least a portion of the complex metal oxide-containing pellets may comprise at least one precious metal selected from the group consisting of Pt, Rh and Pd when the bed does not contain steam-hydrocarbon reforming catalyst pellets. Pt, Rh and/or Pd act as a catalyst for the steam-methane reforming reaction. The complex metal oxide-containing pellets may optionally comprise the at least one precious metal when the bed does contain steam-hydrocarbon reforming catalyst. Therefore three options are considered: (1) a bed of complex metal oxide-containing pellets and no steam-hydrocarbon reforming catalyst pellets wherein at least a portion of the complex metal oxide-containing pellets comprise a precious metal, (2) a bed of both complex metal oxide-containing pellets and steam-hydrocarbon reforming catalyst pellets wherein none of the complex metal oxide-containing pellets comprise at least one precious metal, and (3) a bed of both complex metal oxide-containing pellets and steam-hydrocarbon reforming catalyst pellets wherein at least a portion of the complex metal oxide-containing pellets comprise at least one precious metal.

When at least one precious metal is included, the complex metal oxide-containing pellets may comprise 0.1 to 10 mass % or 0.2 to 5 mass % of at least one precious metal.

When both complex metal oxide-containing pellets and steam-hydrocarbon reforming catalyst pellets are used, it is preferred to have the pellet types distributed more or less evenly throughout the bed.

A pellet is defined herein as a densely packed but porous mass formed from smaller particles. Suitable pellets may have a characteristic length of between 0.1 mm and 3 mm. The characteristic length is defined as the volume of the pellet divided by the surface area of the pellet. The pellet may have any regular or irregular shape as desired. The pellet may be in the shape of a sphere, cylinder, tablet or the like.

The term "complex metal oxide" is defined herein as a chemical compound comprising oxygen and two or more elements that are regarded as metals in their pure unoxidized state at normal ambient conditions. Complex metal oxides may include, for example, ternary or quaternary metal oxides comprising two and three metallic elements, respectively, in combination with oxygen. In contrast to a complex metal oxide, a simple metal oxide is a combination of only one element and oxygen and is usually referred to as a binary oxide. This distinction between complex and simple oxides is further explained with specific illustrations in *Comprehensive Inorganic Chemistry*, Vol. 2, pp. 729-735, Pergamon Press (1975).

The complex metal oxide-containing pellets comprise 30 to 85 mole % of at least one binding agent selected from the group consisting of calcium titanate ($CaTiO_3$) and calcium aluminate. Accordingly, the complex metal oxide-containing pellets may comprise 30 to 85 mole % of only calcium titanate; the complex metal oxide-containing pellets may comprise 30 to 85 mole % of only calcium aluminate; and the complex metal oxide-containing pellets may comprise 30 to 85 mole % of the calcium titanate and calcium aluminate in combination.

As used herein, the term "calcium aluminate" means any of the various calcium aluminates, for example tricalcium aluminate ($3CaO.Al_2O_3$), dodecacalcium hepta-aluminate ($12CaO.7Al_2O_3$), monocalcium aluminate ($CaO.Al_2O_3$), monocalcium dialuminate ($CaO.2Al_2O_3$), monocalcium hexa-aluminate ($CaO.6Al_2O_3$), dicalcium aluminate ($2CaO.Al_2O_3$), pentacalcium trialuminate ($5CaO.3Al_2O_3$), tetracalcium trialuminate ($4CaO.3Al_2O_3$) and mixtures thereof. The calcium aluminate may contain a minor amount of free CaO that is not tied with alumina.

The complex metal oxide-containing pellets may comprise 30 to 85 mole % of a mixture of tricalcium aluminate and dodecacalcium hepta-aluminate. The complex metal oxide-containing pellets may comprise 30 to 85 mole % of a mixture of monocalcium aluminate and dodecacalcium hepta-aluminate. The complex metal oxide-containing pellets may comprise 30 to 85 mole % of a mixture of tricalcium aluminate, monocalcium aluminate and dodecacalcium hepta-aluminate. The complex metal oxide-containing pellets may comprise 30 to 85 mole % of a mixture of monocalcium aluminate and monocalcium dialuminate. The complex metal oxide-containing pellets may comprise 30 to 85 mole % of a mixture of monocalcium dialuminate and monocalcium hexa-aluminate.

The complex metal oxide-containing pellets may comprise 50 to 75 mole % of at least one binding agent selected from the group consisting of calcium titanate and calcium aluminate. Accordingly, the complex metal oxide-containing pellets may comprise 50 to 75 mole % of only calcium titanate; the complex metal oxide-containing pellets may comprise 50 to 75 mole % of only calcium aluminate; and the complex metal oxide-containing pellets may comprise 50 to 75 mole % of the calcium titanate and calcium aluminate in combination.

The complex metal oxide-containing pellets comprise 15 to 70 mole % of one or more complex metal oxides. Accordingly, the complex metal oxide-containing pellets may comprise 15 to 70 mole % of a single complex metal oxide. The complex metal oxide-containing pellets may comprise 15 to 70 mole % of two or more complex metal oxides in combination. The complex metal oxide-containing pellets may comprise up to 5, or up to 10, or up to 100 different complex metal oxides, as desired.

The complex metal oxide-containing pellets may comprise 25 to 55 mole % of one or more complex metal oxides. Accordingly, the complex metal oxide-containing pellets may comprise 25 to 55 mole % of a single complex metal oxide. The complex metal oxide-containing pellets may comprise 25 to 55 mole % of two or more complex metal oxides in combination.

The complex metal oxides are represented by the formula $A_xB_yO_n$ wherein A represents at least one metallic element having an oxidation state ranging from +1 to +3, inclusive, wherein the at least one metallic element is capable of forming a metal carbonate; x is a number from 1 to 10, inclusive; B represents at least one metallic element having an oxidation state ranging from +1 to +7, inclusive; y is a number form 1 to 10, inclusive; and n represents a value such that the complex metal oxide is rendered electrically neutral.

In the formula for the complex metal oxide, A may represent at least one metallic element selected from the group consisting of elements of Groups 1, 2 and 3, and the Lanthanide elements of the IUPAC Periodic Table of the Elements. B may represent at least one metallic element selected from the group consisting of elements of Groups 4 to 15 of the IUPAC Periodic Table of the Elements. Within this group, B in the complex metal oxide may be selected from the group consisting of vanadium, chromium, manganese, iron, cobalt, copper, nickel, and mixtures thereof.

The complex metal oxide may be at least one of $Ca_2MnFeO_5$, $Ca_2MnFeO_4$, $Ca_2Co_2O_5$, $Ca_2Mn_2O_5$, $MgCaFeMnO_5$, $SrCo_{0.4}Fe_{0.4}Cu_{0.2}O_{3.8}$, $Sr_2Ni_2O_5$, $LaNiO_3$, $Ca_2Fe_2O_5$, and $Sr_2Mn_2O_5$.

Alternatively, A in the formula for the complex metal oxide may represent $A'_{x_1}Ca_{x_2}M_{x_3}$ where A' represents at least one element selected from the group consisting of Sr, Ba, a Group 1 element, and an element of the Lanthanide series according to the IUPAC Periodic Table of the Elements. B in the formula for the complex metal oxide may represent $B'_{y_1}Mn_{y_2}Fe_{y_1}$ where B' represents at least one element selected from the group consisting of Cu, Ni, Co, Cr, and V. Generally, $0 \leq x_1 \leq 1$, $0 \leq x_2 \leq 1$, $0 \leq x_3 \leq 1$, wherein $x_1+x_2+x_3=x$; $0 \leq y_1 \leq 1$, $0 \leq y_2 \leq 1$, $0 \leq y_3 \leq 1$, wherein $y_1+y_2+y_3=y$; $1 \leq x \leq 10$; and $1 \leq y \leq 10$. For some suitable complex metal oxides, $x_1=0$, $y_1=0$, $1 \leq x \leq 5$, and $1 \leq y \leq 5$.

The complex metal oxide-containing pellets may have a structure wherein the crush strength is retained within 1 to 15 lbf/mm after 50 cycles of reduction and oxidation in a process of producing hydrogen. The complex metal oxide-containing pellets may have a structure wherein the crush strength is retained within 1 to 15 lbf/mm after 50 of the production steps and 50 of the regeneration steps.

The complex metal oxide-containing pellets may have a structure wherein the crush strength of the complex metal oxide-containing pellets are retained within 1 to 15 lbf/mm after 50 cycles of $CO_2$ sorption and $CO_2$ desorption wherein the $CO_2$ sorption is by exposing the complex metal oxide-containing pellets to a humidified reducing gas comprising 3 to 4 vol. % $H_2$, 93 to 94 vol. % $CO_2$ and 2 to 3 vol. % $H_2O$ at 750° C. and $CO_2$ desorption is by exposing the complex metal oxide-containing pellets to humidified air comprising 2 to 3 vol. % $H_2O$ at 750° C.

The calcium titanate may be formed by reaction of at least one calcium precursor and $TiO_2$ in a mixture with one or more complex metal carbonates associated with the one or more complex metal oxides under reaction conditions sufficient to form calcium titanate. The reaction conditions may include a temperature range of 600° C. to 1050° C. and a pressure range of 0.1 atm to 100 atm.

The calcium aluminate may be formed by reaction of at least one calcium precursor and at least one of alumina and aluminum hydroxide in a mixture with one or more complex metal carbonates associated with the one or more complex metal oxides under reaction conditions sufficient to form calcium aluminate. A complex metal carbonate is associated with a complex metal oxide when A and B are the same in each. The reaction conditions may include a temperature range of 600° C. to 1050° C. and a pressure range of 0.1 atm to 100 atm.

The complex metal oxide-containing pellets may have any suitable crush strength and pore volume. In general, the crush strength should range from about 1 lbf/mm (4 N/mm) to about 15 lbf/mm (67 N/mm), preferably it should range from 2 lbf/mm (8 N/mm) to 11 lbf/mm (49 N/mm). Most preferably, for a material to be commercially useable as a catalyst support, it is desirable that it have a crush strength greater than 2 lbf/mm (8 N/mm) and most preferably, the crush strength should range from 2 lbf/mm (8 N/mm) to 9 lbf/mm (40 N/mm). As referred to herein, the value representing "crush strength" is determined by the American Society for Testing Materials (ASTM) Standard Test Method D 6175-03 "Standard Test Method for Radial Crush Strength of Extruded Catalyst and Catalyst Carrier Particles."

Suitable steam-hydrocarbon reforming catalyst pellets are known in the art and are available commercially. Suitable steam-hydrocarbon reforming process catalysts include any materials effective for the reforming of methane or higher hydrocarbons with steam to produce hydrogen. These materials may include, for example, any of nickel, cobalt, the platinum group metals (i.e. ruthenium, osmium, rhodium, palladium, platinum, and iridium) and oxides of the foregoing metals. The materials may be supported on zirconia, alumina, or other suitable supports known in the art.

A reactor comprising a bed containing complex metal oxide-containing pellets and optionally containing steam-hydrocarbon reforming catalyst pellets can be constructed by one skilled in the art of hydrogen production. Suitable materials for the operating conditions are known. The construction of reactors for the production of hydrogen are known in the art.

The reactor may be insulated if desired. The reactor may be operated as an adiabatic reactor.

The method for producing a hydrogen-containing gas comprises reacting at least one hydrocarbon with steam in a bed of complex metal oxide-containing pellets in a production step under reaction conditions sufficient to form hydrogen gas and reduced complex metal oxide-containing pellets. At least a portion of the complex metal oxide-containing pellets may comprise a catalyst material suitable for steam-hydrocarbon reforming and/or separate steam-hydrocarbon reforming catalyst pellets may be contained in the bed as described above in the description of the reactor.

As defined herein, reduced complex metal oxide-containing pellets are pellets wherein 50 to 100% of the complex metal oxide is in a reduced form or reduced oxidation state. The oxidation state of the complex metal oxide may be determined by one skilled in the art.

The discussion above of the complex metal oxide-containing pellets and the steam-hydrocarbon reforming catalyst pellets applies also to the method.

Typically, the bed is maintained at an elevated temperature, and the reforming reactions may be effected in the range of 350° C. to 900° C. and more specifically in the range of 600° C. to 800° C. These temperatures and pressures are suitable reaction conditions sufficient to form hydrogen and reduced metal oxide-containing pellets. The pressure in the reactor may range from 1 to 100 atmospheres. Preferred reaction conditions for forming hydrogen and reduced metal oxide-containing pellets may be determined without undue experimentation.

The process for producing a hydrogen-containing gas comprises a step of providing a reactor, and cyclically repeated production and regeneration steps.

The step of providing the reactor includes providing a reactor containing a bed comprising complex metal oxide-containing pellets and optionally comprising steam-hydrocarbon reforming catalyst pellets. At least a portion of the complex metal oxide-containing pellets may comprise a catalyst material suitable for steam-hydrocarbon reforming and/or separate steam-hydrocarbon reforming catalyst pellets may be contained in the bed as described above in the description of the reactor.

The discussion above of the complex metal oxide-containing pellets and the steam-hydrocarbon reforming catalyst pellets applies also to the process.

The production step comprises introducing steam and a feed gas containing at least one hydrocarbon into the reactor, reacting the at least one hydrocarbon with the steam in the bed under reaction conditions sufficient to form hydrogen and reduced complex metal oxide-containing pellets, and withdrawing a product gas comprising hydrogen (i.e. the hydrogen-containing gas) from the reactor.

Any hydrocarbons may be used which are capable of catalyzed reaction with steam to form hydrogen. The at least one hydrocarbon may be selected from aliphatic hydrocarbons having from 1 to 20 carbon atoms, and advantageously may be selected from aliphatic hydrocarbons having 1 to 6 carbon atoms. Desirably, the feed gas may be selected from methane, natural gas, propane, or a mixture of predominantly $C_1$ to $C_4$ aliphatic hydrocarbons.

The steam and the at least one hydrocarbon may be introduced as a gaseous feed mixture. A desirable gaseous feed mixture comprises steam and methane. The methane in the steam/methane gaseous mixture may be obtained from any suitable source, and may be, for example, natural gas from which sulfur compounds have been removed. It is advantageous to include a low level of hydrogen, e.g. about 3 mole % as a product recycle to an inlet to the reactor in order to assist in the reduction/activation of the catalyst and possibly to reduce the likelihood of carbon deposition, particularly where unreformed natural gas or $C_2$ and higher hydrocarbons are present in the feed.

The molar ratio of steam to carbon typically ranges from about 1:1 to about 4:1 or from about 1.3:1 to 2.5:1. The steam to carbon ratio is a common parameter used in the field of hydrocarbon reforming.

The gaseous feed mixture may be a mixture of adiabatically pre-reformed hydrocarbon feedstock (e.g. natural gas) and steam. The adiabatic pre-reforming process is effected by heating the hydrocarbon feedstock to a temperature of about 500° C. and passing the heated gas through an adiabatic nickel catalyst bed. Natural gas typically contains about 5% of heavy hydrocarbon fractions, wherein the term "heavy" is understood to mean fractions containing two or more carbon atoms. The heavy fractions are typically more reactive than methane, and catalytically reform to yield carbon dioxide and hydrogen. The resulting gas mixture therefore contains a mature of methane, carbon dioxide, steam and hydrogen. The pre-reforming reactions typically are endothermic, and because the reaction usually proceeds adiabatically, the temperature of the resulting gas mixture decreases. Typically, the temperature of the gas mixture is reduced to about 450° C. after pre-reforming.

The use of pre-reformed natural gas instead of untreated natural gas has associated advantages. First, the pre-reforming process generates some hydrogen, which is useful for chemically reducing to an active state the catalyst for the subsequent steam-methane reforming reaction. Second, the removal of the heavy hydrocarbon fractions reduces the potential for carbon deposition on the steam-methane reforming catalyst. The use of pre-reforming extends the life of the catalyst, since carbon deposition ultimately leads to the deactivation of the catalyst.

Typically, the bed is maintained at an elevated temperature, and the reforming reactions may be effected in the range of 350° C. to 900° C. and more specifically in the range of 600° C. to 800° C. The pressure in the reactor may range from 1 to 100 atmospheres. Suitable reaction conditions sufficient to form hydrogen and reduced metal oxide-containing pellets may be determined without undue experimentation.

The regeneration step comprises regenerating the reactor by reacting the reduced complex metal oxide-containing pellets and an oxygen source gas under reaction conditions sufficient to oxidize the complex metal oxide-containing pellets. The oxygen source may be selected from the group consisting of air, oxygen, oxygen-depleted air and mixtures thereof. The regeneration pressure may be 0.9 to 2 atmospheres. The regeneration step may be characterized by a regeneration temperature in the range of 450° C. to 900° C.

The production step may be characterized by a production temperature and the regeneration step may be characterized by a regeneration temperature, wherein the regeneration temperature may be greater than the production temperature and wherein the difference between the regeneration temperature and the production temperature may be 100° C. or less.

Regeneration of the reactor may be as described in as described in U.S. patent application Ser. No. 11/165,731 (Pub. No. U.S. 2006/0292069) or U.S. patent application Ser. No. 11/339,060 (Pub. No. U.S. 2007/0172418). Preferred reaction conditions for regeneration may be determined without undue experimentation.

The process may be operated in a thermoneutral manner as discussed in U.S. patent application Ser. No. 11/165,720 (Pub. No. U.S. 2006-0292066-A1).

The product gas comprising hydrogen may be further processed and purified by pressure swing adsorption or other suitable means if desired.

The complex metal oxide-containing pellets may be made by a method of making a complex metal oxide-containing pellet comprising (a) preparing a mixture comprising water, at least one complex metal carbonate, at least one calcium precursor, at least one of $Al(OH)_3$, $AlO(OH)$, $Al_2O_3$ and $TiO_2$, (b) forming a green pellet from the mixture; (c) heating the green pellet; (d) maintaining the green pellet within a temperature range for a first time period; (e) heating the green pellet further; (f) maintaining the green pellet within another temperature range for a second time period; and (g) cooling the green pellet to make the complex metal oxide-containing pellet. The green pellet is exposed to an atmosphere comprising oxygen during at least one of the steps (a) through (f). The green pellet may be exposed to an atmosphere comprising oxygen during all of the steps (a) through (f). The atmosphere comprising oxygen may be air.

As used herein, "green" means not fully processed or fully treated.

In the step of preparing the mixture, the mixture comprises at least one complex metal carbonate in an amount to provide 15 to 70 mole % or 25 to 50 mole % of the one or more complex metal oxides in the complex metal oxide-containing pellet. The mixture also comprises at least one calcium precursor in an amount to provide 30 to 85 mole % or 55 to 75 mole % of at least one binding agent selected from the group consisting of calcium titanate and calcium aluminate in the complex metal oxide-containing pellet. The mixture also comprises at least one of $TiO_2$, $Al_2O_3$, $Al(OH)_3$ and $AlO(OH)$ in an amount to provide 30 to 85 mole % or 55 to 75 mole % of at least one binding agent selected from the group consisting of calcium titanate and calcium aluminate in the complex metal oxide-containing pellet. The mixture also comprises 28 to 36 mass % water. One skilled in the art can calculate the amount of starting material to form the desired concentration of constituents in the final complex metal oxide-containing pellet.

The complex metal carbonate may be represented by the formula $A_xB_y(CO_3)_n$, wherein A represents at least one metallic element having an oxidation state ranging from +1 to +3, inclusive, wherein the at least one metallic element is capable of forming a metal carbonate; x is a number from 1 to 10, inclusive; B represents at least one metallic element having an oxidation state ranging from +1 to +7, inclusive; y is a number from 1 to 10, inclusive; and n represents a value such that the complex metal carbonate is rendered electrically neutral.

In the formula for the complex metal carbonate, A may represent at least one metallic element selected from the group consisting of elements of Groups 1, 2 and 3, and the Lanthanide elements of the IUPAC Periodic Table of the Elements. B may represent at least one metallic element selected from the group consisting of elements of Groups 4 to 15 of the IUPAC Periodic Table of the Elements. Within this group, B in the complex metal oxide may be selected from the group consisting of vanadium, chromium, manganese, iron, cobalt, copper, nickel, and mixtures thereof.

For some suitable complex metal carbonates, A in the formula for the complex metal carbonate may represent $A'_{x_1}Ca_{x_2}Mg_{x_3}$, where A' represents at least one element selected from the group consisting of Sr, Ba, a Group 1 element, and an element of the Lanthanide series according to the IUPAC Periodic Table of the Elements. B in the formula for the complex metal carbonate may represent $B'_{y_1}Mn_{x_2}Fe_{y_1}$ where B' represents at least one element selected from the group consisting of Cu, Ni, Co, Cr, and V. Generally, $0 \leq x_1 \leq 1$, $0 \leq x_2 \leq 1$, $0 \leq x_3 \leq 1$, wherein $x_1+x_2+x_3=x$; $0 \leq y_1 \leq 1$, $0 \leq y_2 \leq 1$, $0 \leq y_3 \leq 1$, wherein $y_1+y_2+y_3=y$; $1 \leq x \leq 10$; and $1 \leq y \leq 10$. For some suitable complex metal carbonates, $x_1=0$, $y_3=0$, $1 \leq x \leq 5$, and $1 \leq y \leq 5$.

At least a portion of the complex metal carbonate may have a particle size between 0 and 74 microns or between 0 and 44 microns.

Complex metal carbonates may be prepared as a precipitate. At least one water-soluble salt of A, at least one water-soluble salt of B and a carbonate salt and/or bicarbonate salt is reacted in solution. As used herein the phrase "a carbonate salt and/or bicarbonate salt" means either a carbonate salt and bicarbonate salt, or a carbonate salt or a bicarbonate salt. For complex metal carbonate preparation, the carbonate salt and/or bicarbonate salt is present in a molar amount that is at least 3 times the stoichiometric amount of carbonate and/or bicarbonate salt required to form a mole of carbonate precipitate represented by the formula $A_xB_y(CO_3)_n$, wherein n is a number that renders the carbonate precipitate substantially charge neutral. This means that the carbonate salt and/or bicarbonate salt is present in the reaction mixture in a molar amount that is at least 3 times the value of n in the formula $A_xB_y(CO_3)_n$, wherein, in addition to representing the number that renders the carbonate precipitate substantially charge neutral, n represents the stoichiometric number of moles of carbonate needed to form the carbonate precipitate. Thus, at least 3 times the stoichiometric amount means that 3n moles of carbonate and/or bicarbonate salt are required to produce 1 mole of $A_xB_y(CO_3)_n$.

The carbonate salt and/or bicarbonate salt may be present in the reaction mixture in a molar amount that is at least 5 times or at least 7 times the stoichiometric value of n.

The $TiO_2$ may be in Anatase form. Alumina may be in the form of gamma alumina. Aluminum hydroxide may be in the form of boehmite. The $TiO_2$, alumina and aluminum hydroxide may have particle sizes between 0 and 10 microns.

The calcium precursor may be selected from the group consisting of CaO, $CaCO_3$, $Ca(OH)_2$, $Ca(NO_3)_2$ and $Ca(CH_3CO_2)_2$. The calcium precursor may have a particle size between 0 and 10 microns.

The mixture may optionally further comprise 0.1 to 5 mass % or 1 to 3 mass % of a pore former. The pore former may be methocel pore former or other pore former known in the art. Suitability of various pore former may be determined without undue experimentation.

The mixture may optionally further comprise 0.2 to 10 mass % or 0.2 to 5 mass % of at least one precious metal selected from the group consisting of Pt, Rh, and Pd.

In the step of forming the pellet, the pellet may be formed by extruding the mixture through a die. Alternatively, the pellet may be formed by compressing the mixture in a mold. Any method of forming a pellet known in the art may be used.

In the step of heating the green pellet, the green pellet is heated from a first temperature, $T_1$, to a second temperature, $T_2$, at a first average heating rate between 0.1° C./minute to 10° C./minute. The first temperature $T_2$, is within a first temperature range, wherein the first temperature range is between 5° C. and 50° C. The first temperature may be room temperature (about 25° C.). The second temperature $T_2$, is a minimum temperature, $T_{2min}$, of a second temperature range, the second temperature range extending from the minimum temperature, $T_{2min}$, of the second temperature range to a maximum temperature, $T_{2max}$, of the second temperature range. The minimum temperature, $T_{2min}$, of the second temperature range may be 600° C. or 650° C. and the maximum temperature, $T_{2max}$, of the second temperature range may be 700° C. or 750° C.

In the step of heating the green pellet, the time to heat from the first temperature to the second temperature is the first heating time, $t_1$. The first average heating rate is defined as $$\frac{T_2 - T_1}{t_1}.$$

In the step of maintaining the green pellet within a temperature range for a first time period, the green pellet is maintained within the second temperature range and the first time period is between 15 minutes and 4 hours. When maintaining the temperature within the second temperature range, the temperature may be increased and/or decreased within the second temperature range.

In the step of heating the green pellet further; the green pellet is heated from the maximum temperature, $T_{2max}$, of the second temperature range to a third temperature, $T_3$, at a second average rate of 0.1° C./minute to 10° C./minute, wherein the third temperature is a minimum temperature, $T_{3min}$, of a third temperature range, the third temperature range extending from the minimum temperature, $T_{3min}$, of the third temperature range to a maximum temperature, $T_{3max}$, of the third temperature range wherein the minimum temperature, $T_{3min}$, of the third temperature range is 900° C. and the maximum temperature, $T_{3max}$, of the third temperature range is 1050° C.

In the step of heating the green pellet further, the time to heat from the maximum temperature, $T_{2max}$, of the second temperature range to the third temperature, $T_3$, is the second heating time, $t_2$. The second average rate is defined as $$\frac{T_3 - T_{2max}}{t_2}.$$

In the step of maintaining the green pellet within another temperature range for a second time period, the pellet is maintained within the third temperature range and the second time period is between 15 minutes and 4 hours. When maintaining the temperature within the third temperature range, the temperature may be increased and/or decreased within the third temperature range.

In the step of cooling the green pellet, the pellet is cooled to a fourth temperature, $T_4$, wherein the fourth temperature is within a fourth temperature range. The fourth temperature range is between 0° C. and 50° C. The fourth temperature may be, for example, room temperature. Cooling may be by one or more of natural convection, forced convection, conduction and radiation. The rate or method of cooling is not critical.

The pellets are a product by process of the method of making a complex metal oxide-containing pellet.

The generation of hydrogen from hydrocarbons and steam using the method, process and reactor may be illustrated by way of exemplary process flowsheet of the FIGURE.

A hydrocarbon-containing feed gas, for example, methane provided by natural gas, optionally mixed with 1-15 mole % hydrogen, flows via conduit 1 at a pressure in the range of 100 to 600 psia to preheat exchanger 3 and is heated therein to a typical temperature in the range of about 200° C. to about 400° C. by heat exchange with a hot process stream (later defined) supplied via conduit 5. The feed may be desulfurized using metal promoted carbon (not shown) prior to conduit 1, or using ZnO (not shown) after preheating but prior to conduit 7. The heated feed flows via conduit 7 and open valve 9 and is mixed with process steam provided via conduit 11 to form a hydrocarbon-steam feed mixture. Alternatively, steam may be added prior to valve 9 if desired (not shown).

The steam-hydrocarbon mixture is introduced into heat exchange zone 13 and is further heated therein by heat exchange with a hot process stream (later defined). The heat exchange zone described here can be a recuperative or a conventional heat exchanger. Heat exchange can take place against any of the hot streams exiting the reactor. The steam-hydrocarbon mixture may be heated to a temperature in the range of about 350° C. to about 900° C., and typically may be in the range of about 600° C. to about 800° C. The heated mixture then is introduced via conduit 16 into reactor 17, which has a bed packed with complex metal oxide-containing pellets and optionally steam-hydrocarbon reforming catalyst as discussed for the method, process and reactor. Alternatively, the heat exchange zone can be a portion of the reactor itself, at either or both of its ends, and conduits may not be necessary. The reactor 17 itself may be substantially adiabatic and insulated, preferably by an internal lining of refractory material(s). The feed mixture reacts in the bed to form primarily hydrogen and carbon dioxide, and, in much smaller amounts, carbon monoxide. The carbon dioxide is substantially retained by reaction with the complex metal oxide in the bed.

The inventory of chemically bound oxygen available for reaction, i.e., the oxygen associated with the complex metal oxide and steam reactants, may be adjusted in the reactor design so that the reaction product effluent stream leaves reactor 17 via conduit 19 at a time-averaged temperature between about 400° C. and about 800° C. The reaction product effluent stream flows via conduit 15 to heat exchange zone 13, where it is cooled to a temperature in the range of about 250° C. to about 500° C. by heat exchange with incoming reactants as earlier described, or regenerant as described below. The cooled reaction product effluent stream exits heat exchange zone 13 via open valve 21 and is further cooled in heat exchange zone 3 and optionally boiler 23 to yield a further cooled reaction product effluent stream in conduit 25 at a typical temperature of 40° C. Any condensate is knocked out at this point (not shown).

The cooled reaction product stream containing hydrogen, small amounts of carbon dioxide, carbon monoxide and unreacted methane is introduced into pressure swing adsorption (PSA) system 27 and is separated therein to yield a high-purity hydrogen product containing at least 99 vol. % hydrogen that is withdrawn via conduit 29. Components removed from the hydrogen by the PSA system typically include carbon dioxide, water, methane and carbon monoxide, and these are withdrawn in a waste gas via conduit 31 during the blowdown and purge steps typically used in PSA process cycles. Any PSA cycle and system known in the art may be used in the process described in this and other embodiments of the invention. The waste gas in conduit 31 typically contains combustible components and may be used as fuel in a fired boiler, 33, or in a direct fired heater to preheat regenerant air (not shown).

The mixture of complex metal oxide material and steam-hydrocarbon reforming catalyst in reactor 17 has a finite inventory of chemically bound oxygen and a finite reaction capacity for carbon dioxide. Once either of these is exhausted, the purity and yield of hydrogen in the reaction product effluent stream leaving reactor 17 via conduit 19 will begin to decrease. The time at which this occurs can be determined by real-time analysis of the stream by any known analytical means, such as, for example, in-line IR spectroscopy. At this point, reactor 17 is switched to regeneration mode by closing valve 9 and depressurizing the reactor via conduits 19, conduit 32, conduit 35, open valve 37, and conduit 39, wherein the hydrocarbon-containing blowdown gas is introduced into boiler 33 or a direct fired air heater (not shown). At this point, valve 41 remains closed. The blowdown can be cocurrent or countercurrent. In case the blowdown is countercurrent, the piping would need to be modified accordingly.

Valve 37 is then closed, valve 41 is then opened and reactor 17 is purged with a suitable purge gas such as steam or nitrogen to remove residual hydrocarbons from the reactor void volume. In this embodiment, steam for purge is provided via conduit 11 and flows through heat exchanger 13 and conduit 16 into the reactor. Purge effluent gas leaves the reactor via conduits 19 and 32, flows through heat exchanger 43, open valve 41, conduit 45, heat exchanger 47, and conduit 49 into boiler 33. The purge may be cocurrent or countercurrent with appropriate modifications to the flowsheet, easily recognized by one skilled in the art.

A particular feature of this embodiment is that the switching valves such as valve 9 or 51 are on the cooler side of the heat exchange zones 13 or 43. While this requires each reactor to be associated with its individual heat exchange zone, it does ease the mechanical requirements and operating life of the switching valves. It is possible to combine heat exchange zones 13 and 43 into a single heat exchanger (not shown here), but that would require the valves to be repositioned to the hotter side of the heat exchange zone.

The FIGURE shows the heat exchange zones to be of the conventional type where heat exchange between streams is contemporaneous. The heat exchange zones could also be recuperative in nature (not shown), where heat from a cooling stream is stored in the heat capacitance of the zone, and released to a warming stream in a subsequent step. The zones would comprise of inert solids such as ceramic pellets or firebrick. They could be located in a separate vessel, or form a portion of the reactor vessel itself at either or both ends, adjacent to the reaction zone which is the active zone filled with mixed metal oxide and reforming catalyst.

Regeneration of reactor 17 then is initiated by opening previously-closed valve 51. Air is provided via intake conduit 55 to compressor 57 and is compressed therein to about 15 to 100 psia and the compressed air in conduit 59 is preheated in heat exchanger 47 to about 250° C. to about 500° C., and introduced via conduit 61 and valve 51 into the heat exchange zone 43. The air is further heated in heat exchange zone 43 against hot exhaust gas from conduit 32 (later described), or hot reactor effluent as described earlier, to a temperature between about 500° C. and about 900° C., typically from about 700° C. to about 800° C. The heated air flows via conduits 53 and 16 into reactor 17, and the oxygen in the air regenerates the complex metal oxide material by oxidizing the reduced (spent) metal oxide and releasing the carbon dioxide previously reacted with the complex metal oxide material. The carbon dioxide-rich, oxygen-depleted regeneration off-gas leaves the reactor via conduit 19 and conduit 32 at a temperature in the range of about 600° C. to about 900° C. and typically from about 650° C. to about 800° C. The hot regeneration off-gas in conduit 32 is introduced into heat exchange zone 43 (this may be integrated with heat exchange zone 13) to heat the air entering via valve 51 as earlier described, or to heat the hydrocarbon-steam feed mixture as earlier described, whereby the off-gas is cooled to a temperature in the range of about 350° C. to about 600° C. The cooled regeneration off-gas flows via valve 41 and is further cooled to a temperature in the range of about 200° C. to about 300° C. in heat exchanger 47, thereby heating compressed air stream 59 as earlier described. The cooled regeneration off-gas stream in conduit 49 still contains some residual oxygen, and may be introduces into boiler 33 for additional heat recovery.

Following the substantial regeneration of reactor 17 by removal of most or all of the carbon dioxide retained therein during the reaction step, the reactor may be purged with an inert gas and repressurized with steam, feed gas, or product gas. Following repressurization, the reactor proceeds to the reaction step and the cycle is repeated as described earlier.

Reactor 63 is operated through the same cycle steps described above for reactor 17, but the cycle of reactor 63 is staggered so that it operates in the regeneration mode when reactor 17 operates in the reaction or hydrogen production mode. Hydrocarbon-containing feed gas flows via valve 65, steam is added via conduit 67, the feed-steam mixture is heated in heat exchanger 13, and the heated feed flows via conduits 69 and 71 to reactor 63. Reaction product gas leaves the reactor via conduits 72 and 73, is cooled in heat exchanger 13, and flows via valve 75, conduit 5, heat exchanger 3, boiler 23, and conduit 25 to PSA system 27. Regeneration air is provided to reactor 63 via valve 77, heat exchanger 43, and conduit 71, and blowdown or depressurization gas exits via conduit 81, valve 83, and conduit 39 into boiler 33. Regeneration off-gas leaves reactor 63 via conduit 85, heat exchanger 43, and valve 87, and then flows via conduit 45, heat exchanger 47, and conduit 49 to boiler 33.

Reactors 17 and 63 thus are operated in a staggered sequence between the hydrogen production and regeneration modes by the proper operation of switch valves 9, 21, 37, 41, 51, 65, 75, 77, 83, and 87 as described above. Operation with two parallel reactors with constant hydrogen product flow is possible when the elapsed time of the hydrogen production mode is equal to or greater than that of the regeneration mode. However, any suitable number of reactors in parallel may be used in staggered operation to achieve continuous hydrogen production. In practice, the duration of the hydrogen production step using a particular complex metal oxide may be different than the duration of the regeneration step. For example, if the regeneration step is twice as long as the production step, a configuration employing three parallel beds may be advantageously used wherein two beds are being regenerated while the third bed is used for hydrogen production.

U.S. patent application Ser. No. 11/339,060 (Pub. No. U.S. 2007/0172418) discloses a similar process flowsheet utilizing four parallel beds, which may be suitably adapted for the method, process and reactor for generating hydrogen.

EXAMPLES

The following examples illustrate the dimensional stability of pellets made according to the method of making a complex metal oxide-containing pellet and various other methods. The examples are not intended to limit the invention to any of the specific details described therein.

Complex metal carbonate powder used in the examples was prepared by the following method.

Several batches of carbonate powder with the nominal composition of $Ca_2FeMn(CO_3)_5$ were prepared by precipitation of soluble salts in aqueous $NaHCO_3$. An aqueous solution was prepared by dissolving $Ca(NO_3)_2 \bullet 4H_2O$, $Fe(NO_3)_3 \bullet 9H_2O$, and $MnCl_2 \bullet 4H_2O$ in deionized water in a 2 to 1 to 1 molar ratio.

The resulting solution volume was 40 ml with a $Ca^{2+}$ concentration of 0.46 M. A flask containing 300 ml of 1.0 M $NaHCO_3$ was heated to between 80 to 95° C. and stirred vigorously. Some batches included a $CO_2$ gas purge. The Ca—Fe—Mn solution was added dropwise to the $NaHCO_3$ solution, resulting in a brownish precipitate. Once the precipitation was complete, the solid was collected by filtration and rinsed repeatedly. Following brief air drying, the solid was added to 1 L of water, stirred briefly, filtered, and rinsed repeatedly. This washing procedure was repeated a second time. The product was dried at 100° C. for 12 hours in an air purged oven.

Complex metal oxide powder used in some of the examples was prepared by the following method. Complex metal oxide powder was prepared by placing complex metal carbonate powder in a porcelain crucible and heating the powder in an air purged oven to 100° C. for 2 hours, followed by heating at a rate of 2° C./minute to a temperature of 750° C. and maintaining at 750° C. for 12 hours. The product was a black solid complex metal oxide powder with a composition of $Ca_2FeMnO_5$.

In each of the examples, samples were subjected to a $CO_2$ sorption/desorption cycle test. The test was performed using a thermogravimetric analyzer (TGA). A sample was placed in the TGA and heated to either 700° C. or 750° C., as noted in each example, while purging the sample with an inert nitrogen gas stream. The sample was exposed to either dry or humidified reducing gas containing $CO_2$ for 30 minutes to chemically adsorb carbon dioxide from the gas mixture, thereby forming $CaCO_3$ and simultaneously reducing the oxidation state of the Fe/Mn oxides present in the oxide material by transferring oxygen to the feed gas.

The dry reducing gas was about 4 vol. % $H_2$ and 96 vol. % $CO_2$. Humidified reducing gas was made by bubbling the dry reducing gas through water at room temperature. This resulted in a humidified reducing gas having about 2 to 3 vol. % water.

The gain in weight due to sorption of $CO_2$ by the oxide material was recorded by the TGA. After the sample was heated to 700° C. or 750° C. and was saturated with $CO_2$, the sample was regenerated by exposing the sample to either dry or humidified air for 30 minutes. Humidified air was made by bubbling air through water at room temperature. The exposure to air decomposed the $CaCO_3$, raised the oxidation state of the Fe/Mn oxides present in the sample, and reformulated the sample back to its original composition.

The weight loss due to $CO_2$ removal from the sample was recorded again by the TGA. The cycling between exposing the sample to the reducing gas and air was repeated for a specified number of cycles noted in each example.

Example 1

A batch of pellets was prepared by mixing complex metal oxide powder with 2 mass % organic binder based on the mass of the complex metal oxide powder and dry pressing the powder into ⅛ inch diameter pellets. Some of the pellets were calcined at 1000° C. and others at 1100° C. The performance of these pellets was tested for 15 cycles in the TGA using a dry atmosphere as described above for the $CO_2$ sorption/desorption cycle test. The sorption of $CO_2$ was carried out at 700° C. and the desorption at 750° C.

Pellets calcined at 1000° C. and 1100° C. showed good initial $CO_2$ sorption capacity of 23-24 mass %, but the capacity started to decrease after about 10 cycles. The $CO_2$ sorption capacity continued to decrease with every additional cycle, and was considerably lower than the initial capacity after 15 cycles. Examination of the pellets after the cycle test revealed that the pellets grew considerably in size and had essentially zero crush strength.

This example illustrates that dimensionally stable pellets can not be prepared by simply pressing complex metal oxide powder with an organic binder.

Example 2

A batch of pellets was prepared by mixing complex metal oxide powder with 20 mass % of the inorganic binder bentonite, 2 mass % methocel pore former and water. Another batch of pellets was prepared by mixing complex metal oxide powder with 20 mass % of the inorganic binder calcium aluminate, 2 mass % methocel pore former and water. Mass percentages are based on the mass of the complex metal oxide powder. The mixtures were extruded through a one-inch screw extruder to form pellets. The pellets were dried at 120° C. and then calcined at 1000° C. for 2 hours.

The bentonite-containing pellets and calcium aluminate-containing pellets were each tested by exposing them to 50 cycles of the $CO_2$ sorption/desorption cycle test in the TGA using a dry atmosphere described above for the $CO_2$ sorption/desorption cycle test. Sorption of $CO_2$ was carried out at 700° C. and desorption at 750° C. Both groups of pellets showed an initial $CO_2$ sorption capacity of about 22 mass %. The $CO_2$ sorption capacity of the pellets did not change even after 50 cycles, but they grew considerably in size and fell apart upon removal from the TGA.

This example illustrates that dimensionally stable pellets can not be prepared by extruding complex metal oxide powder mixed with an inorganic binder, such as bentonite or calcium aluminate.

Example 3

A number of different pellets were prepared to test the effect of mixing either complex metal carbonate or complex metal oxide with inorganic alumina binder in the form of gamma alumina and water. The gamma alumina was prepared by dispersing boehmite powder in a 0.05 N nitric acid solution. A mixture was formed by mixing either complex metal carbonate or complex metal oxide with 30 to 50 mass % inorganic alumina binder in the form of gamma alumina based on the mass of carbonate or oxide powder, and with 0 to 2 mass % pore former in the form of urea, NaCl, or mineral oil. The mixture as used to prepare 1/16 inch diameter pellets by extruding in a lab-scale extruder.

The pellets that were prepared without pore former were dried at 120° C. and then heated from room temperature to 900° C. at a heating rate of 5° C./minute in a single calcination step. The final calcination temperature of 900° C. was maintained for 1 hour.

The pellets that were prepared with a pore former were dried at 120° C. and then calcined in two steps in a controlled manner. They were heated at 2° C./minute or 5° C./minute from room temperature to 600° C. in a furnace in air. The calcination temperature was maintained at 600° C. for either 60 or 120 minutes to burn off pore former and consolidate the structure of the pellets. The pellets were then heated at a heating rate of 5° C./minute from 600° C. to 900° C. The calcination temperature was maintained at 900° C. for 2 hours.

The various pellets were each tested by exposing them to 50 cycles of the $CO_2$ sorption/desorption cycle test in the TGA using a dry atmosphere described above for the $CO_2$ sorption/desorption cycle test. Both sorption and desorption of $CO_2$ were carried out at 700° C. These pellets showed an initial $CO_2$ sorption capacity ranging from 8 mass % to 12 mass %. The $CO_2$ sorption capacity of the various pellets did not change even after 50 cycles, but they grew considerably in size and lacked suitable crush strength. The post analysis of the pellets revealed formation of minor amount of calcium aluminate by the reaction of the calcium present in the complex metal oxide and gamma alumina.

This example illustrates that dimensionally stable pellets can not be prepared by extruding complex metal carbonate or complex metal oxide powder mixed with an inorganic binder that reacts with the calcium present in the carbonate or oxide.

Example 4

Pellets as prepared in Example 3 were tested by exposing them to 50 cycles of the $CO_2$ sorption/desorption cycle test in the TGA using a humidified atmosphere. Both sorption and desorption of $CO_2$ were carried out at 700° C. These pellets showed an initial $CO_2$ sorption capacity ranging from 8 mass % to 12 mass %. The $CO_2$ sorption capacity of the pellets began to decrease slowly with each additional cycle. The pellets grew considerably in size and lacked suitable crush strength after the 50 cycles. Post analysis of the pellets showed signs of formation of considerable amount of calcium aluminate by the reaction between calcium present in the complex metal oxide and gamma alumina, resulting in a slow decrease in $CO_2$ sorption capacity.

This example illustrates that dimensionally stable pellets can not be prepared by extruding complex metal carbonate or complex metal oxide powder mixed with an inorganic binder that reacts with the calcium present in the complex metal carbonate or oxide.

Example 5

Pellets as prepared in Example 3 were tested by exposing them to 50 cycles of the $CO_2$ sorption/desorption cycle test in the TGA using a humidified atmosphere. Both sorption and desorption of $CO_2$ were carried out at 750° C. These pellets showed an initial $CO_2$ sorption capacity ranging from 8 mass % to 12 mass %. The $CO_2$ sorption capacity of the pellets decreased rapidly with each additional cycle. The pellets grew considerably in size and lacked suitable crush strength after the 50 cycles. Post analysis of the pellets showed significant amount of calcium aluminate formation by the reaction between calcium present in the complex metal oxide and gamma alumina, resulting in a sharp decrease in $CO_2$ sorption capacity.

This example illustrates that dimensionally stable pellets can not be prepared by extruding complex metal carbonate or complex metal oxide powder mixed with an inorganic binder that reacts with the calcium present in the complex metal carbonate or oxide.

Example 6

A mixture was formed by mixing complex metal oxide with 40 mass % inorganic alpha alumina binder based on the mass of oxide powder, 2 mass % methocel pore former, and water. The mixture as used to prepare 1/16 inch diameter pellets by extruding in a lab-scale extruder.

The pellets were dried at 120° C. and then calcined in two steps in a controlled manner. They were heated at 2° C./minute from room temperature to 600° C. in a furnace in air. The calcination temperature was maintained at 600° C. for 60 minutes to burn off pore former and consolidate the structure of the pellets. The pellets were then heated at a heating rate of 5° C./minute from 600° C. to 900° C. The calcination temperature was maintained at 900° C. for 2 hours.

The pellets were tested by exposing them to 50 cycles of the $CO_2$ sorption/desorption cycle test in the TGA using a humidified atmosphere described above for the $CO_2$ sorption/desorption cycle test. Both sorption and desorption of $CO_2$ were carried out at 700° C. These pellets showed an initial $CO_2$ sorption capacity ranging from 12 mass % to 14 mass %. The $CO_2$ sorption capacity of the pellets began to decrease slowly with each additional cycle. After 50 cycles, the pellets grew considerably in size and lacked suitable crush strength. Post analysis of the pellets showed signs of formation of calcium aluminate by the reaction between calcium pressing in the complex metal oxide and alpha alumina, resulting in a slow decrease in $CO_2$ sorption capacity.

This example illustrates that dimensionally stable pellets can not be prepared by extruding complex metal oxide powder mixed with an inorganic binder that reacts with the calcium present in the complex metal oxide.

Example 7

Pellets as prepared in Example 6 were tested by exposing them to 50 cycles of the $CO_2$ sorption/desorption cycle test in the TGA using a humidified atmosphere. Both sorption and desorption of $CO_2$ were carried out at 750° C. These pellets showed an initial $CO_2$ sorption capacity of about 5 mass %. The $CO_2$ sorption capacity of the pellets decreased rapidly with each additional cycle. The pellets grew considerably in size and lacked suitable crush strength after the 50 cycles. Post analysis of the pellets showed significant amount of calcium aluminate formation by the reaction between calcium present in the complex metal oxide and alpha alumina, resulting in a sharp decrease in initial and subsequent $CO_2$ sorption capacity.

This example illustrates that dimensionally stable pellets can not be prepared by extruding complex metal carbonate or complex metal oxide powder mixed with an inorganic binder that reacts with the calcium present in the carbonate or oxide.

Example 8

A mixture was formed by mixing complex metal oxide with 40 mass % inorganic calcium titanate binder based on the mass of oxide powder, 5 mass % methocel pore former, and water. The mixture as used to prepare 1/16 inch diameter pellets by extruding in a lab-scale extruder.

The pellets were dried at 120° C. and then calcined in two steps in a controlled manner. They were heated at 2° C./minute from room temperature to 600° C. in a furnace in air. The calcination temperature was maintained at 600° C. for 60 minutes to burn off pore former and consolidate the structure of the pellets. After the first step, one group of pellets was heated at a heating rate of 5° C./minute from 600° C. to 1000° C. The calcination temperature was maintained at 1000° C. for 2 hours. After the first step, another group of pellets was subsequently heated at a heating rate of 5° C./minute from 600° C. to 1100° C. The calcination temperature was maintained at 1100° C. for 2 hours.

The pellets were tested by exposing them to 50 cycles of the $CO_2$ sorption/desorption cycle test in the TGA using a dry atmosphere described above for the $CO_2$ sorption/desorption cycle test. Both sorption and desorption of $CO_2$ were carried out at 700° C. These pellets showed an initial $CO_2$ sorption capacity ranging from 10 mass % to 14 mass %. The $CO_2$ sorption capacity of the pellets did not change even after 50 cycles, but the pellets grew considerably in size and lacked suitable crush strength.

This example illustrates that dimensionally stable pellets can not be prepared by extruding complex metal oxide powder mixed with conventionally prepared inorganic binder.

Example 9

A mixture was formed by mixing complex metal oxide with 40 mass % inorganic calcium titanate binder based on the mass of oxide powder, 2 mass % methocel pore former, and water. The mixture as used to prepare 1/16 inch diameter pellets by extruding in an extruder.

The pellets were dried at 120° C. and then calcined in two steps in a controlled manner. They were heated at 2° C./minute from room temperature to 600° C. in a furnace in air. The calcination temperature was maintained at 600° C. for 60 minutes to burn off pore former and consolidate the structure of the pellets. After the first step, the of pellets were heated at a heating rate of 5° C./minute from 600° C. to 1000° C. The calcination temperature was maintained at 1000° C. for 2 hours.

The pellets were tested by exposing them to 50 cycles of the $CO_2$ sorption/desorption cycle test in the TGA using a dry atmosphere described above for the $CO_2$ sorption/desorption cycle test. Both sorption and desorption of $CO_2$ were carried out at 700° C. These pellets showed an initial $CO_2$ sorption capacity of only about 4.5 mass %. The $CO_2$ sorption capacity of the pellets did not change even after 50 cycles, but the pellets grew considerably in size and lacked suitable crush strength.

This example illustrates that dimensionally stable pellets can not be prepared by extruding complex metal oxide powder mixed with conventionally prepared inorganic binder.

Example 10

A mixture was formed by mixing complex metal oxide with 50 mass % inorganic calcium titanate binder based on the mass of oxide powder, 2 mass % methocel pore former, and water. The mixture as used to prepare 1/16 inch diameter pellets by extruding in a lab-scale extruder.

The pellets were dried at 120° C. and then calcined in two steps in a controlled manner. They were heated at 2° C./minute from room temperature to 600° C. in a furnace in air. The calcination temperature was maintained at 600° C. for 60 minutes to burn off pore former and consolidate the structure of the pellets. After the first step, the of pellets were heated at a heating rate of 5° C./minute from 600° C. to 900° C. The calcination temperature was maintained at 900° C. for 2 hours.

The pellets were tested by exposing them to 50 cycles of the $CO_2$ sorption/desorption cycle test in the TGA using a humidified atmosphere described above for the $CO_2$ sorption/desorption cycle test. The sorption of $CO_2$ was carried out at 700° C. and the desorption of $CO_2$ carried out at 750° C. These pellets showed an initial $CO_2$ sorption capacity of 9 to 11 mass %. The $CO_2$ sorption capacity of the pellets did not change even after 50 cycles, but the pellets grew considerably in size and lacked suitable crush strength.

This example illustrates that dimensionally stable pellets can not be prepared by extruding complex metal oxide powder mixed with conventionally prepared inorganic binder.

Example 11

A mixture was formed by mixing complex metal oxide with 50 mass % inorganic calcium titanate binder based on the mass of oxide powder, 2 mass % methocel pore former, and water. The mixture as used to prepare 1/16 inch diameter pellets by extruding in a lab-scale extruder.

The pellets were dried at 120° C. and then calcined in two steps in a controlled manner. They were heated at 2° C./minute from room temperature to 600° C. in a furnace in air. The calcination temperature was maintained at 600° C. for 60 minutes to burn off pore former and consolidate the structure of the pellets. After the first step, the of pellets were heated at a heating rate of 5° C./minute from 600° C. to 1100° C. The calcination temperature was maintained at 1100° C. for 2 hours.

The pellets were tested by exposing them to 50 cycles of the $CO_2$ sorption/desorption cycle test in the TGA using a humidified atmosphere described above for the $CO_2$ sorption/desorption cycle test. The sorption of $CO_2$ was carried out at 700° C. and the desorption of $CO_2$ carried out at 750° C. These pellets showed an initial $CO_2$ sorption capacity of 9 to 10 mass %. The $CO_2$ sorption capacity of the pellets did not change even after 50 cycles, but the pellets grew considerably in size and lacked suitable crush strength.

This example illustrates that dimensionally stable pellets can not be prepared by extruding complex metal oxide powder mixed with conventionally prepared inorganic binder.

Example 12

In this example, pellets were formed according to the method of making a complex metal oxide-containing pellet. A mixture was prepared by mixing complex metal carbonate, calcium oxide, titanium dioxide, 2 mass % methocel pore former, and about 30 mass % water. Calcium oxide and titanium dioxide were provided in a stoichiometric amount to form, in-situ, about 50 mass % inorganic calcium titanate binder based on the mass of the complex metal oxide formed from the complex metal carbonate. The calcium oxide powder was made by decomposing calcium carbonate at 900° C.

The mixture was used to prepare 1/16 inch diameter green pellets by extruding in a lab-scale extruder. The green pellets were dried at 120° C. and then calcined in two steps in a controlled manner. The pellets were heated at 0.5° C./minute from room temperature to 750° C. in a furnace in air. The calcination temperature was maintained at 750° C. for 2 hours to consolidate the structure of the green pellets. The green pellets were then heated at 0.5° C./minute from 750° C. to 1000° C. The green pellets were maintained at 1000° C. for 2 hours to further consolidate the structure and form calcium titanate in-situ. The green pellets were then cooled down to room temperature to form the pellets in final form.

The pellets were tested by exposing them to 50 cycles of the $CO_2$ sorption/desorption cycle test in the TGA using a humidified atmosphere described above for the $CO_2$ sorption/desorption cycle test. Both the sorption and desorption was carried out at 750° C. These pellets showed an initial $CO_2$ sorption capacity of 9 to 10 mass %. The $CO_2$ sorption capacity of the pellets did not change even after 50 cycles. The pellets retained their shape, and size and maintained suitable crush strength.

This example illustrates that dimensionally stable pellets can be prepared by the method of making a complex metal oxide-containing pellet described above.

Example 13

In this example, pellets were formed according to the method of making a complex metal oxide-containing pellet. A mixture was prepared by mixing complex metal carbonate, calcium oxide, titanium dioxide, 2 mass % methocel pore former, and about 30 mass % water. Calcium oxide and titanium dioxide were provided in a stoichiometric amount to form, in-situ, about 50 mass % inorganic calcium titanate binder based on the mass of the complex metal oxide formed from the complex metal carbonate. The calcium oxide powder was made by decomposing calcium carbonate at 900° C.

The mixture was used to prepare 1/16 inch diameter green pellets by extruding in a lab-scale extruder. The green pellets were dried at 120° C. and then calcined in two steps in a controlled manner. The pellets were heated at 0.5° C./minute from room temperature to 750° C. in a furnace in air. The calcination temperature was maintained at 750° C. for 2 hours to consolidate the structure of the green pellets. The green pellets were then heated at 0.5° C./minute from 750° C. to 1050° C. The green pellets were maintained at 1050° C. for 2 hours to further consolidate the structure and form calcium titanate in-situ. The green pellets were then cooled down to room temperature to form the pellets in final form.

The pellets were tested by exposing them to 50 cycles of the $CO_2$ sorption/desorption cycle test in the TGA using a humidified atmosphere described above for the $CO_2$ sorption/desorption cycle test. Both the sorption and desorption was carried out at 700° C. These pellets showed an initial $CO_2$ sorption capacity of about 9 mass %. The $CO_2$ sorption capacity of the pellets did not change even after 50 cycles. The pellets retained their shape, and size and maintained suitable crush strength.

This example illustrates that dimensionally stable pellets can be prepared by the method of making a complex metal oxide-containing pellet described above.

Example 14

In this example, pellets were formed according to the method of making a complex metal oxide-containing pellet. A mixture was prepared by mixing complex metal carbonate, calcium oxide, titanium dioxide, and about 30 mass % water. No pore former was used. The complex metal carbonate was sieved to pass through 200 US mesh screen prior to its use, resulting in complex metal carbonate particles less than about 74 microns. Calcium oxide and titanium dioxide were provided in a stoichiometric amount to form, in-situ, about 50 mass % inorganic calcium titanate binder based on the mass of the complex metal oxide formed from the complex metal carbonate. The calcium oxide particles were less than 10 microns as were the titanium dioxide particles.

The mixture was used to prepare 1/16 inch diameter green pellets by extruding in a one-inch extruder. The green pellets were dried at 120° C. and then calcined in three steps in a controlled manner. The pellets were heated at 2° C./minute from room temperature to 600° C. in a furnace in air. The calcination temperature was maintained at 600° C. for 10 minutes consolidate the structure of the green pellets. The green pellets were then heated at 0.5° C./minute from 600° C.

to 700° C. The green pellets were maintained at 700° C. for 30 minutes to further consolidate the structure of the pellets. The green pellets were then heated at a heating rate of 5° C./minute from 700° C. to 1000° C. The green pellets were maintained at 1000° C. for two hours to form calcium titanate in-situ. The green pellets were then cooled down to room temperature to form the pellets in final form.

The pellets were tested by exposing them to 50 cycles of the $CO_2$ sorption/desorption cycle test in the TGA using a humidified atmosphere described above for the $CO_2$ sorption/desorption cycle test. Both the sorption and desorption was carried out at 750° C. These pellets showed an initial $CO_2$ sorption capacity of about 11 mass %. The $CO_2$ sorption capacity of the pellets did not change even after 50 cycles. The pellets retained their shape and maintained suitable crush strength. There was a very slight change in the dimensions of the pellets.

This example illustrates that dimensionally stable pellets can be prepared by the method of making a complex metal oxide-containing pellet described above.

Example 15

In this example, pellets were formed according to the method of making a complex metal oxide-containing pellet. A mixture was prepared by mixing complex metal carbonate, calcium oxide, titanium dioxide, and about 30 mass % water. No pore former was used. The complex metal carbonate was sieved to pass through 325 US mesh screen prior to its use, resulting in complex metal carbonate particles less than about 44 microns. Calcium oxide and titanium dioxide were provided in a stoichiometric amount to form, in-situ, about 50 mass % inorganic calcium titanate binder based on the mass of the complex metal oxide formed from the complex metal carbonate. The calcium oxide particles were less than 10 microns as were the titanium dioxide particles.

The mixture was used to prepare 1/16 inch diameter green pellets by extruding in a one-inch extruder. The green pellets were dried at 120° C. and then calcined in three steps in a controlled manner. The pellets were heated at 2° C./minute from room temperature to 600° C. in a furnace in air. The calcination temperature was maintained at 600° C. for 10 minutes consolidate the structure of the green pellets. The green pellets were then heated at 0.5° C./minute from 600° C. to 700° C. The green pellets were maintained at 700° C. for 30 minutes to further consolidate the structure of the pellets. The green pellets were then heated at a heating rate of 5° C./minute from 700° C. to 1000° C. The green pellets were maintained at 1000° C. for 2 hours to form calcium titanate in-situ. The green pellets were then cooled down to room temperature to form the pellets in final form.

The pore volume and median pore diameter of the pellets were determined by a mercury porosimeter. The pore volume of the pellets was about 0.35 cc/g and the median pore diameter was about 3600 Å.

The pellets were tested by exposing them to 50 cycles of the $CO_2$ sorption/desorption cycle test in the TGA using a humidified atmosphere described above for the $CO_2$ sorption/desorption cycle test. Both the sorption and desorption was carried out at 750° C. These pellets showed an initial $CO_2$ sorption capacity of about 11 mass %. The $CO_2$ sorption capacity of the pellets did not change even after 50 cycles. The pellets retained their shape and maintained suitable crush strength. There was a very slight change in the dimensions of the pellets.

This example illustrates that dimensionally stable pellets can be prepared by the method of making a complex metal oxide-containing pellet described above.

Example 16

In this example, pellets were formed according to the method of making a complex metal oxide-containing pellet. A mixture was prepared by mixing complex metal carbonate, calcium oxide, titanium dioxide, and about 30 mass % water. No pore former was used. The complex metal carbonate was sieved to pass through 200 US mesh screen prior to its use, resulting in complex metal carbonate particles less than about 74 microns. Calcium oxide and titanium dioxide were provided in a stoichiometric amount to form, in-situ, about 50 mass % inorganic calcium titanate binder based on the mass of the complex metal oxide formed from the complex metal carbonate. The calcium oxide particles were less than 10 microns as were the titanium dioxide particles.

The mixture was used to prepare 1/16 inch diameter green pellets by extruding in a one-inch extruder. The green pellets were dried at 120° C. and then calcined in two steps in a controlled manner. The pellets were heated at 0.5° C./minute from room temperature to 750° C. in a furnace in air. The calcination temperature was maintained at 750° C. for 2 hours consolidate the structure of the green pellets. The green pellets were then heated at 0.5° C./minute from 750° C. to 1000° C. The green pellets were maintained at 1000° C. for 2 hours to further consolidate the structure of the pellets and to form calcium titanate in-situ. The green pellets were then cooled down to room temperature to form the pellets in final form.

The pellets were tested by exposing them to 50 cycles of the $CO_2$ sorption/desorption cycle test in the TGA using a humidified atmosphere described above for the $CO_2$ sorption/desorption cycle test. Both the sorption and desorption was carried out at 750° C. These pellets showed an initial $CO_2$ sorption capacity of about 11 mass %. The $CO_2$ sorption capacity of the pellets did not change even after 50 cycles. The pellets did not retain their size and shape and did not maintain suitable crush strength.

This example illustrates that the maximum temperature of the first heating step should be below about 750° C. in order to form dimensionally stable pellets.

Example 17

In this example, pellets were formed according to the method of making a complex metal oxide-containing pellet. A mixture was prepared by mixing complex metal carbonate, calcium oxide, titanium dioxide, and about 30 mass % water. No pore former was used. The complex metal carbonate was sieved to pass through 325 US mesh screen prior to its use, resulting in complex metal carbonate particles less than about 44 microns. Calcium oxide and titanium dioxide were provided in a stoichiometric amount to form, in-situ, about 50 mass % inorganic calcium titanate binder based on the mass of the complex metal oxide formed from the complex metal carbonate. The calcium oxide particles were less than 10 microns as were the titanium dioxide particles.

The mixture was used to prepare 1/16 inch diameter green pellets by extruding in a one-inch extruder. The green pellets were dried at 120° C. and then calcined in two steps in a controlled manner. The pellets were heated at 0.5° C./minute from room temperature to 750° C. in a furnace in air. The calcination temperature was maintained at 750° C. for 2 hours to consolidate the structure of the green pellets. The green pellets were then heated at 0.5° C./minute from 750° C. to 1000° C. The green pellets were maintained at 1000° C. for 2 hours to further consolidate the structure of the pellets and to form calcium titanate in-situ. The green pellets were then cooled down to room temperature to form the pellets in final form.

The pellets were tested by exposing them to 50 cycles of the $CO_2$ sorption/desorption cycle test in the TGA using a humidified atmosphere described above for the $CO_2$ sorption/desorption cycle test. Both the sorption and desorption was carried out at 750° C. These pellets showed an initial $CO_2$ sorption capacity of about 12 mass %. The $CO_2$ sorption capacity of the pellets did not change even after 50 cycles. The pellets did not retain their size and shape and did not maintain suitable crush strength.

This example illustrates that the maximum temperature of the first heating step should be below about 750° C. in order to form dimensionally stable pellets.

Example 18

In this example, pellets were formed according to the method of making a complex metal oxide-containing pellet. A mixture was prepared by mixing complex metal carbonate, calcium carbonate, titanium dioxide, and about 30 mass % water. No pore former was used. The complex metal carbonate was sieved to pass through 325 US mesh screen prior to its use, resulting in complex metal carbonate particles less than about 44 microns. Calcium carbonate and titanium dioxide were provided in a stoichiometric amount to form, in-situ, about 50 mass % inorganic calcium titanate binder based on the mass of the complex metal oxide formed from the complex metal carbonate. The calcium carbonate particles were less than 10 microns as were the titanium dioxide particles.

The mixture was used to prepare 1/16 inch diameter green pellets by extruding in a one-inch extruder. The green pellets were dried at 120° C. and then calcined in three steps in a controlled manner. The pellets were heated at 2° C./minute from room temperature to 600° C. in a furnace in air. The calcination temperature was maintained at 600° C. for 10 minutes to consolidate the structure of the green pellets. The green pellets were then heated at 0.5° C./minute from 600° C. to 700° C. The green pellets were maintained at 700° C. for 30 minutes to further consolidate the structure of the pellets. The green pellets were then heated at a heating rate of 5° C./minute from 700° C. to 1000° C. The green pellets were maintained at 1000° C. for 2 hours to form calcium titanate in-situ. The green pellets were then cooled down to room temperature to form the pellets in final form.

The pellets were tested by exposing them to 50 cycles of the $CO_2$ sorption/desorption cycle test in the TGA using a humidified atmosphere described above for the $CO_2$ sorption/desorption cycle test. Both the sorption and desorption was carried out at 750° C. These pellets showed an initial $CO_2$ sorption capacity of about 10 mass %. The $CO_2$ sorption capacity of the pellets did not change even after 50 cycles. The pellets retained their size and shape and maintained suitable crush strength.

This example illustrates that dimensionally stable pellets can be prepared by the method of making a complex metal oxide-containing pellet described above.

Example 19

In this example, pellets were formed according to the method of making a complex metal oxide-containing pellet. A mixture was prepared by mixing complex metal carbonate, calcium carbonate, aluminum oxide in the form of boehmite, methocel as a pore former and about 30 mass % water. 2% pore former was added based on the weight of the solid. The complex metal carbonate was sieved to pass through 200 US mesh screen prior to its use, resulting in complex metal carbonate particles less than about 74 microns. Calcium carbonate and aluminum oxide were provided in a stoichiometric amount to form, in-situ, about 50 mass % inorganic calcium aluminate binder in the form of $CaO.Al_2O_3$. The mass of calcium carbonate, aluminum oxide, and complex metal oxide used in the mixture was selected to provide 50% by mass complex metal oxide formed by the decomposition of complex metal carbonate and 50% by mass calcium aluminate form by in-situ reaction of calcium carbonate and alumina. The calcium carbonate particles were less than 10 microns as were the aluminum dioxide particles.

The mixture was used to prepare 1/16 inch diameter green pellets by extruding in a one-inch extruder. The green pellets were dried at 120° C. and then calcined in three steps in a controlled manner. The pellets were heated at 2° C./minute from room temperature to 600° C. in a furnace in air. The calcination temperature was maintained at 600° C. for 10 minutes to consolidate the structure of the green pellets. The green pellets were then heated at 0.5° C./minute from 600° C. to 700° C. The green pellets were maintained at 700° C. for 30 minutes to further consolidate the structure of the pellets. The green pellets were then heated at a heating rate of 5° C./minute from 700° C. to 1000° C. The green pellets were maintained at 1000° C. for 2 hours to form calcium aluminate in-situ. The green pellets were then cooled down to room temperature to form the pellets in final form.

The pellets were tested by exposing them to 50 cycles of the $CO_2$ sorption/desorption cycle test in the TGA using a humidified atmosphere described above for the $CO_2$ sorption/desorption cycle test. Both the sorption and desorption was carried out at 750° C. These pellets showed an initial $CO_2$ sorption capacity of about 10 mass %. The $CO_2$ sorption capacity of the pellets did not change even after 50 cycles. The pellets retained their size and shape and maintained suitable crush strength.

This example illustrates that dimensionally stable pellets can be prepared by the method of making a complex metal oxide-containing pellet described above.

Example 20

This example describes the use of dimensionally stable pellets prepared according to the present invention for producing hydrogen in a cyclic manner. Pellets prepared in Examples 14 and 15 were mixed together. Approximately 60 grams of mixed pellets were weighed and then mixed with close to 60 g of nickel-based steam methane reforming catalyst. The steam-methane reforming catalyst was ground to pass through US 30 mesh screen but retained by US 20 mesh screen. The pellet-catalyst mix was loaded into a tubular reactor, approximately 1 inch in diameter, that was electrically heated from outside. The mix was pressurized to 400 psig pressure and heated to 775° C. under the flow of an inert nitrogen stream. When the temperature was stabilized, a flow of 600 sccm of steam was initiated through the reactor. Thereafter, a flow of 25 sccm of hydrogen and 200 sccm of methane was initiated through the reactor. The steam to methane ratio in the feed gas was about 3:1. The product gas was passed through a heat exchanger to condense steam and then through a gas liquid separator to remove condensate from the product. The composition of product gas exiting the reactor was continuously monitored for the concentration of hydrogen, carbon dioxide, carbon monoxide and unreacted methane.

The product gas exiting the reactor contained close to about 90% hydrogen, 9% methane and less than 1% of both carbon monoxide and carbon dioxide. The production of large amount of hydrogen and trace amounts of carbon oxides continued for about 20 minutes at which point the complex metal oxide pellets were saturated with carbon dioxide and retained no longer carbon dioxide. The concentration of carbon oxides and methane started to increase after 20 minutes and that of hydrogen decreased with time. After about 30 minutes the flow of methane and hydrogen was stopped and the reactor pressure was reduced to close to atmospheric pressure. A flow of air at 200 sccm was initiated to regenerate complex metal oxide pellets.

The concentration of hydrogen, carbon monoxide and methane in the product gas decreased to close to zero after 2 to 3 minutes and the concentration of carbon dioxide started to increase, indicating release of carbon dioxide and regeneration of pellets. The flow rate of air was continued for a total of 90 minutes and then stopped. The reactor was purged briefly and then pressurized with nitrogen to 400 psig. This represented one full cycle of producing hydrogen and regenerating pellets.

The hydrogen production followed by regeneration of pellet cycle was repeated for a total of 64 cycles. Thereafter, the reactor was cooled under inert nitrogen gas and pellets were recovered and tested for crush strength and dimensions. The pellets retained their shape and maintained suitable crush strength.

Example 21

In this example, pellets were formed according to the method of making a complex metal oxide-containing pellet. A mixture was prepared by mixing about 65 g complex metal carbonate, about 38 g calcium oxide (0.68 mole), about 33.5 g aluminum oxide in the form of boehmite, 2 g Methocel as a pore former and about 65 g water. The complex metal carbonate was sieved to pass through 200 US mesh screen prior to its use, resulting in complex metal carbonate particles less than about 74 microns. Boehmite contained about 75% pure aluminum oxide. So, the amount of aluminum oxide used was about 0.25 moles. The amounts of calcium oxide and alumina were selected to form in-situ calcium aluminate binder having an effective composition of about $11CaO.4Al_2O_3$ (likely a mixture of dodecacalcium hepta-aluminate and monocalcium aluminate) during calcination. The mass of calcium oxide, aluminum oxide, and complex metal oxide used in the mixture was selected to provide 50% by mass complex metal oxide formed by the decomposition of complex metal carbonate and 50% by mass calcium aluminate formed by in-situ reaction of calcium oxide and alumina. The calcium oxide particles were less than 10 microns as were the aluminum dioxide particles.

The mixture was used to prepare 1/16 inch diameter green pellets by extruding in a one-inch extruder. The green pellets were dried at 120° C., then calcined in three steps in a controlled manner. The pellets were heated at 2° C./minute from room temperature to 600° C. in a furnace in air. The calcination temperature was maintained at 600° C. for 30 minutes to consolidate the structure of the green pellets. The green pellets were then heated at 0.5° C./minute from 600° C. to 700° C. The green pellets were maintained at 700° C. for 30 minutes to further consolidate the structure of the pellets. The green pellets were then heated at a heating rate of 5° C./minute from 700° C. to 1000° C. The green pellets were maintained at 1000° C. for 2 hours to form calcium aluminate in-situ. The green pellets were then cooled down to room temperature to form the pellets in final form.

The pellets were tested by exposing them to 50 cycles of the $CO_2$ sorption/desorption cycle test in the TGA using a humidified atmosphere described above for the $CO_2$ sorption/desorption cycle test. Both the sorption and desorption was carried out at 750° C. These pellets showed an initial $CO_2$ sorption capacity of about 12.5 mass %. The $CO_2$ sorption capacity of the pellets did not change even after 50 cycles. The pellets retained their size and shape. The initial and final diameter of pellets was about 1.2 mm. The initial crush strength of the pellets was 1.7 lb/mm. It increased to 2.3 lb/mm after 50 cycles.

Example 22

In this example, pellets were formed according to the method of making a complex metal oxide-containing pellet. A mixture was prepared by mixing about 65 g complex metal carbonate, about 36 g calcium carbonate, which was equivalent to 0.36 moles of CaO, about 33.5 g aluminum oxide in the form of boehmite, and about 49 g water. The complex metal carbonate was sieved to pass through 200 US mesh screen prior to its use, resulting in complex metal carbonate particles less than about 74 microns. Boehmite contained about 75% pure aluminum oxide. So, the amount of aluminum oxide used was about 0.25 moles. The amounts of calcium oxide and alumina were selected to form in-situ calcium aluminate binder in the form an effective composition of about $3CaO.2Al_2O_3$ during calcination. The mass of calcium oxide, aluminum oxide, and complex metal oxide used in the mixture was selected to provide 50% by mass complex metal oxide formed by the decomposition of complex metal carbonate and 50% by mass calcium aluminate formed by in-situ reaction of calcium oxide and alumina. The calcium carbonate particles were less than 10 microns as were the aluminum dioxide particles.

The mixture was used to prepare 1/16 inch diameter green pellets by extruding in a one-inch extruder. The green pellets were dried at 120° C., then calcined in three steps in a controlled manner. The pellets were heated at 2° C./minute from room temperature to 600° C. in a furnace in air. The calcination temperature was maintained at 600° C. for 30 minutes to consolidate the structure of the green pellets. The green pellets were then heated at 0.5° C./minute from 600° C. to 700° C. The green pellets were maintained at 700° C. for 30 minutes to further consolidate the structure of the pellets. The green pellets were then heated at a heating rate of 5° C./minute from 700° C. to 1000° C. The green pellets were maintained at 1000° C. for 2 hours to form calcium aluminate in-situ. The green pellets were then cooled down to room temperature to form the pellets in final form.

The pellets were tested by exposing them to 50 cycles of the $CO_2$ sorption/desorption cycle test in the TGA using a humidified atmosphere described above for the $CO_2$ sorption/desorption cycle test. Both the sorption and desorption was carried out at 750° C. These pellets showed an initial $CO_2$ sorption capacity of about 11 mass %. The $CO_2$ sorption capacity of the pellets did not change even after 50 cycles. The pellets retained their size and shape. The initial and final diameter of pellets was about 1.1 mm. The initial crush strength of the pellets was 4.1 lb/mm. It did not change after 50 cycles.

Example 23

The pellet preparation procedure described in Example 22 was repeated using the same amounts of ingredients in the mixture with the exception of adding ~2 g of magnesium carbonate into the mixture. Magnesium carbonate decomposed during calcination to produce magnesium oxide, help the calcination process, and improve crush strength of the pellets. The magnesium carbonate particles were less than 10 microns.

The mixture was used to prepare 1/16 inch diameter green pellets by extruding in a one-inch extruder. The green pellets were dried at 120° C. and calcined using the procedure described in Example 22.

The pellets were tested by exposing them to 50 cycles of the $CO_2$ sorption/desorption cycle test in the TGA using a humidified atmosphere described above for the $CO_2$ sorption/desorption cycle test. Both the sorption and desorption was carried out at 750° C. These pellets showed a slightly higher initial $CO_2$ sorption capacity of about 15 mass %. The $CO_2$ sorption capacity of the pellets did not change even after 50 cycles. The pellets retained their size and shape. The initial and final diameter of pellets was about 1.1 mm. The initial crush strength of the pellets was 3.7 lb/mm. It increased to about 4.5 lb/mm after 50 cycles.

Example 24

In this example, pellets were formed according to the method of making a complex metal oxide-containing pellet. A mixture was prepared by mixing about 65 g complex metal carbonate, about 54 g calcium carbonate, which was equivalent to 0.45 moles of CaO, about 33.5 g aluminum oxide in the form of boehmite, 2 g Methocel as a pore former, and about 52 g water. The complex metal carbonate was sieved to pass through 200 US mesh screen prior to its use, resulting in complex metal carbonate particles less than about 74 microns. Boehmite contained about 75% pure aluminum oxide. So, the amount of aluminum oxide used was about 0.25 moles. The amounts of calcium oxide and alumina were selected to form in-situ calcium aluminate binder having an effective composition of about 11 CaO.6Al$_2$O$_3$ (likely a mixture of dodecacalcium hepta-aluminate and monocalcium aluminate) during calcination. The mass of calcium oxide, aluminum oxide, and complex metal oxide used in the mixture was selected to provide 50% by mass complex metal oxide formed by the decomposition of complex metal carbonate and 50% by mass calcium aluminate formed by in-situ reaction of calcium oxide and alumina. The calcium carbonate particles were less than 10 microns as were the aluminum dioxide particles.

The mixture was used to prepare 1/16 inch diameter green pellets by extruding in a one-inch extruder. The green pellets were dried at 120° C., then calcined in three steps in a controlled manner. The pellets were heated at 2° C./minute from room temperature to 600° C. in a furnace in air. The calcination temperature was maintained at 600° C. for 30 minutes to consolidate the structure of the green pellets. The green pellets were then heated at 0.5° C./minute from 600° C. to 700° C. The green pellets were maintained at 700° C. for 30 minutes to further consolidate the structure of the pellets. The green pellets were then heated at a heating rate of 5° C./minute from 700° C. to 1000° C. The green pellets were maintained at 1000° C. for 2 hours to form calcium aluminate in-situ. The green pellets were then cooled down to room temperature to form the pellets in final form.

The pellets were tested by exposing them to 50 cycles of the $CO_2$ sorption/desorption cycle test in the TGA using a humidified atmosphere described above for the $CO_2$ sorption/desorption cycle test. Both the sorption and desorption was carried out at 750° C. These pellets showed an initial $CO_2$ sorption capacity of about 16 mass %. The $CO_2$ sorption capacity of the pellets did not change even after 50 cycles. The pellets retained their size and shape. The initial and final diameter of pellets was about 1.2 mm. The initial crush strength of the pellets was 3.4 lb/mm. It did not change after 50 cycles.

The structure of the pellets made according to the examples were analyzed by conventional techniques, such as x-ray diffraction, to try to determine a characteristic to describe the structural differences between those that had a suitable crush strength and those that did not. The structure of the pellets that retain their crush strength is different but other than the crush strength itself, no discernable characteristic was found by the conventional techniques.

Although the present invention has been described as to specific embodiments or examples, it is not limited thereto, but may be changed or modified into any of various other forms without departing from the scope of the invention as defined in the accompanying claims.

We claim:

1. A reactor for producing a hydrogen-containing gas comprising:
   a bed containing complex metal oxide-containing pellets and optionally containing steam-hydrocarbon reforming catalyst pellets wherein at least a portion of the complex metal oxide-containing pellets comprise at least one metal selected from the group consisting of Pt, Rh and Pd when the bed does not contain steam-hydrocarbon reforming catalyst pellets and wherein the complex metal oxide-containing pellets optionally comprise the at least one metal when the bed does contain steam-hydrocarbon reforming catalyst, and wherein the complex metal oxide-containing pellets comprise:
   30 to 85 mole % of one or more binding agents selected from the group consisting of calcium titanate and calcium aluminate; and
   15 to 70 mole % of one or more complex metal oxides wherein the one or more complex metal oxides are represented by the formula $A_xB_yO_n$ wherein A represents at least one metallic element having an oxidation state ranging from +1 to +3, inclusive, wherein the at least one metallic element is capable of forming a metal carbonate; x is a number from 1 to 10, inclusive; B represents at least one metallic element having an oxidation state ranging from +1 to +7, inclusive; y is a number form 1 to 10, inclusive; and n represents a value such that the complex metal oxide is rendered electrically neutral;
   wherein the complex metal oxide-containing pellets have a crush strength of 1 to 15 lbf/mm as determined in accordance with ASTM standard test method D 6175-03;
   wherein the complex metal oxide-containing pellets have a structure wherein the crush strength is retained within 1 to 15 lbf/mm after 50 cycles of reduction and oxidation in a process of producing hydrogen;
   wherein the calcium titanate, if present, is formed by reaction of at least one calcium precursor and TiO$_2$ in a mixture with one or more complex metal carbonates associated with the one or more complex metal oxides; and
   wherein the calcium aluminate, if present, is formed by reaction of at least one calcium precursor and at least one of alumina and aluminum hydroxide in a mixture with one or more complex metal carbonates associated with the one or more complex metal oxides.

2. The reactor of claim 1 wherein the complex metal oxide-containing pellets comprise 15 to 70 mole % of a single complex metal oxide.

3. The reactor of claim 1 wherein A in the one or more complex metal oxides represents at least one metallic element selected from the group consisting of elements of Groups 1, 2, and 3, and the Lanthanide elements of the IUPAC Periodic Table of the Elements; and B represents at least one metallic element selected from the group consisting of elements of Groups 4 to 15 of the IUPAC Periodic Table of the Elements.

4. The reactor of claim 1 wherein B in the one or more complex metal oxides is selected from the group consisting of vanadium, chromium, manganese, iron, cobalt, copper, nickel, and mixtures thereof.

5. The reactor of claim 1 wherein the one or more complex metal oxides are selected from $Ca_2MnFeO_5$, $Ca_2MnFeO_4$, $Ca_2Co_2O_5$, $Ca_2Mn_2O_5$, $MgCaFeMnO_5$, $SrCo_{0.4}Fe_{0.4}Cu_{0.2}O_{3.8}$, $Sr_2Ni_2O_5$, $LaNiO_3$, $Ca_2Fe_2O_5$, and $Sr_2Mn_2O_5$.

6. The reactor of claim 1 wherein the complex metal oxide-containing pellets comprise 0.1 to 10 mass % of the at least one metal selected from the group consisting of Pt, Rh, and Pd.

7. The reactor of claim 1 wherein:
A is $A'_{x_1}Ca_{x_2}Mg_{x_3}$;
B is $B'_{y_1}Mn_{y_2}Fe_{y_3}$;
where A' represents at least one element selected from the group consisting of Sr, Ba, a Group 1 element, and an element of the Lanthanide series according to the IUPAC Periodic Table of the Elements; B' represents at least one element selected from the group consisting of Cu, Ni, Co, Cr, and V;
$0 \leq x_1 \leq 1$, $0 \leq x_2 \leq 1$, $0 \leq x_3 \leq 1$, wherein $x_1+x_2+x_3=x$;
$0 \leq y_1 \leq 1$, $0 \leq y_2 1$, $0 \leq y_3 \leq 1$, wherein $y_1+y_2+y_3=y$;
$1 \leq x \leq 10$; and
$1 \leq y \leq 10$.

8. A method of producing a hydrogen-containing gas comprising: reacting at least one hydrocarbon with steam in a bed containing complex metal oxide-containing pellets and optionally containing steam-hydrocarbon reforming catalyst pellets in a production step under reaction conditions sufficient to form hydrogen gas and reduced complex metal oxide-containing pellets, wherein at least a portion of the complex metal oxide-containing pellets comprise at least one metal selected from the group consisting of Pt, Rh and Pd when the bed does not contain steam-hydrocarbon reforming catalyst pellets and wherein the complex metal oxide-containing pellets optionally comprise the at least one metal when the bed does contain steam-hydrocarbon reforming catalyst, and wherein the complex metal oxide-containing pellets comprise:
30 to 85 mole % of one or more binding agents selected from the group consisting of calcium titanate and calcium aluminate; and
15 to 70 mole % of one or more complex metal oxides wherein the one or more complex metal oxides are represented by the formula $$A_xB_yO_n$$

wherein A represents at least one metallic element having an oxidation state ranging from +1 to +3, inclusive, wherein the at least one metallic element is capable of forming a metal carbonate; x is a number from 1 to 10, inclusive; B represents at least one metallic element having an oxidation state ranging from +1 to +7, inclusive; y is a number form 1 to 10, inclusive; and n represents a value such that the complex metal oxide is rendered electrically neutral;
wherein the complex metal oxide-containing pellets have a crush strength of 1 to 15 lbf/mm as determined in accordance with ASTM standard test method D 6175-03;
wherein the complex metal oxide-containing pellets have a structure wherein the crush strength is retained within 1 to 15 lbf/mm after 50 cycles of reduction and oxidation in a process of producing hydrogen;
wherein the calcium titanate, if present, is formed by reaction of at least one calcium precursor and $TiO_2$ in a mixture with one or more complex metal carbonates associated with the one or more complex metal oxides; and
wherein the calcium aluminate, if present, is formed by reaction of at least one calcium precursor and at least one of alumina and aluminum hydroxide in a mixture with one or more complex metal carbonates associated with the one or more complex metal oxides.

9. A process of producing a hydrogen-containing gas comprising:
(a) providing the reactor of claim 1;
(b) in a production step, introducing steam and a feed gas containing at least one hydrocarbon into the reactor, reacting the at least one hydrocarbon and the steam in the bed under reaction conditions sufficient to form hydrogen and reduced complex metal oxide-containing pellets, and withdrawing a product gas comprising hydrogen from the reactor;
(c) in a regeneration step, regenerating the reactor by reacting the reduced complex metal oxide-containing pellets and an oxygen source gas under reaction conditions sufficient to oxidize the complex metal oxide-containing pellets; and
(d) repeating (b) and (c) in a cyclic manner.

10. The process of claim 9 wherein the complex metal oxide-containing pellets have a structure wherein the crush strength is retained within 1 to 15 lbf/mm after 50 of the production steps and 50 of the regeneration steps.

11. The process of claim 9 wherein the calcium titanate is formed by reaction of at least one calcium precursor and $TiO_2$ in a mixture with one or more complex metal carbonates associated with the one or more complex metal oxides.

12. The process of claim 9 wherein the calcium aluminate is formed by reaction of at least one calcium precursor and at least one of alumina and aluminum hydroxide in a mixture with one or more complex metal carbonates associated with the one or more complex metal oxides.

13. The process of claim 9 wherein the complex metal oxide-containing pellets comprise 15 to 70 mole % of a single complex metal oxide.

14. The process of claim 9 wherein the complex metal oxide-containing pellets further comprise 0.1 to 10 mass % of at least one metal selected from the group consisting of Pt, Rh, and Pd.

15. The process of claim 9 wherein:
A is $A'_{x_1}Ca_{x_2}Mg_{x_3}$;
B is $B'_{y_1}Mn_{y_2}Fe_{y_3}$;
where A' represents at least one element selected from the group consisting of Sr, Ba, a Group 1 element, and an element of the Lanthanide series according to the IUPAC Periodic Table of the Elements; B' represents at least one element selected from the group consisting of Cu, Ni, Co, Cr, and V;
$0 \leq x_1 \leq 1$, $0 \leq x_2 \leq 1$, $0 \leq x_3 \leq 1$, wherein $x_1+x_2+x_3=x$;
$0 \leq y_1 \leq 1$, $0 \leq y_2 \leq 1$, $0 \leq y_3 \leq 1$, wherein $y_1+y_2+y_3=y$;

$1 \leq x \leq 10$; and
$1 \leq y \leq 10$.

16. A complex metal oxide-containing pellet comprising:
30 to 85 mole % of one or more binding agents selected from the group consisting of calcium titanate and calcium aluminate; and
15 to 70 mole % of one or more complex metal oxides wherein the one or more complex metal oxides are represented by the formula $$A_xB_yO_n$$

wherein A represents at least one metallic element having an oxidation state ranging from +1 to +3, inclusive, wherein the at least one metallic element is capable of forming a metal carbonate; x is a number from 1 to 10, inclusive; B represents at least one metallic element having an oxidation state ranging from +1 to +7, inclusive; y is a number form 1 to 10, inclusive; and n represents a value such that the complex metal oxide is rendered electrically neutral;
wherein the complex metal oxide-containing pellet has a crush strength of 1 to 15 lbf/mm as determined in accordance with ASTM standard test method D 6175-03; and
wherein the complex metal oxide-containing pellet has a structure wherein the crush strength of the complex metal oxide-containing pellet is retained within 1 to 15 lbf/mm after 50 cycles of $CO_2$ desorption and $CO_2$ desorption wherein the $CO_2$ sorption is by exposing the complex metal oxide-containing pellet to a humidified reducing gas comprising 3 to 4 vol. % $H_2$, 93 to 94 vol. % $CO_2$ and 2 to 3 vol. % $H_2O$ at 750° C. and $CO_2$ desorption is by exposing the complex metal oxide-containing pellet to humidified air comprising 2 to 3 vol. % $H_2O$ at 750° C.;
wherein the calcium titanate, if present, is formed by reaction of at least one calcium precursor and $TiO_2$ in a mixture with one or more complex metal carbonates associated with the one or more complex metal oxides; and
wherein the calcium aluminate, if present, is formed by reaction of at least one calcium precursor and at least one of alumina and aluminum hydroxide in a mixture with one or more complex metal carbonates associated with the one or more complex metal oxides.

17. The complex metal oxide-containing pellet of claim 16 made by a method comprising the steps of:
(a) preparing a mixture, the mixture comprising:
at least one complex metal carbonate in an amount to provide the 15 to 70 mole % of the one or more complex metal oxides in the complex metal oxide-containing pellet;
at least one calcium precursor in an amount to provide the 30 to 85 mole % of the one or more binding agents in the complex metal oxide-containing pellet;
at least one of $TiO_2$, $Al_2O_3$, $Al(OH)_3$ and $AlO(OH)$ in an amount to provide the 30 to 85 mole % of the one or more binding agents in the complex metal oxide-containing pellet; and
28 to 36 mass % water;
(b) forming a green pellet from the mixture;
(c) heating the green pellet from a first temperature to a second temperature at a first average heating rate of 0.1° C./minute to 10° C./minute,
wherein the first temperature is within a first temperature range wherein the first temperature range is between 5° C. and 50° C., and
wherein the second temperature is a minimum temperature of a second temperature range, the second temperature range extending from the minimum temperature of the second temperature range to a maximum temperature of the second temperature range wherein the minimum temperature of the second temperature range is 600° C. and the maximum temperature of the second temperature range is 750° C.;
(d) maintaining the green pellet within the second temperature range for a first time period of between 15 minutes and 4 hours;
(e) heating the green pellet from the maximum temperature of the second temperature range to a third temperature at a second average rate of 0.1° C./minute to 10° C./minute, wherein the third temperature is a minimum temperature of a third temperature range, the third temperature range extending from the minimum temperature of the third temperature range to a maximum temperature of the third temperature range wherein the minimum temperature of the third temperature range is 900° C. and the maximum temperature of the third temperature range is 1050° C.;
(f) maintaining the green pellet within the third temperature range for a second time period of between 15 minutes and 4 hours; and
(g) cooling the green pellet to a fourth temperature, wherein the fourth temperature is within a fourth temperature range wherein the fourth temperature range is between 0° C. and 50° C., to make the complex metal oxide-containing pellet;
wherein the green pellet is exposed to an atmosphere comprising oxygen during at least one of steps (a) through (f).

18. The complex metal oxide-containing pellet of claim 17 wherein the green pellet is exposed to the atmosphere comprising oxygen during all of steps (a) through (f).

19. The complex metal oxide-containing pellet of claim 17 wherein the mixture further comprises 0.1 to 10 mass % of at least one metal selected from the group consisting of Pt, Rh, and Pd.

20. The complex metal oxide-containing pellet of claim 17 wherein the complex metal carbonate is represented by the formula $$A_xB_y(CO_3)_m$$

wherein A represents at least one metallic element having an oxidation state ranging from +1 to +3, inclusive, wherein the at least one metallic element is capable of forming a metal carbonate; x is a number from 1 to 10, inclusive; B represents at least one metallic element having an oxidation state ranging from +1 to +7, inclusive; y is a number form 1 to 10, inclusive; and m represents a value such that the complex metal carbonate is rendered electrically neutral.

21. The complex metal oxide-containing pellet of claim 17 wherein the calcium precursor is selected from the group consisting of CaO, $CaCO_3$, $Ca(OH)_2$, $Ca(NO_3)_2$ and $Ca(CH_3CO_2)_2$.

* * * * *

UNITED STATES PATENT AND TRADEMARK OFFICE
CERTIFICATE OF CORRECTION

PATENT NO.        : 8,038,981 B2                                         Page 1 of 1
APPLICATION NO.   : 12/352863
DATED             : October 18, 2011
INVENTOR(S)       : Diwakar Garg et al.

It is certified that error appears in the above-identified patent and that said Letters Patent is hereby corrected as shown below:

Column 31
Line 54, after "of", insert -- at least --

Column 33
Line 23, change "D 6175-03" to -- D6175-03 --

Signed and Sealed this
Fifteenth Day of May, 2012

David J. Kappos
*Director of the United States Patent and Trademark Office*